(12) United States Patent
Miyake

(10) Patent No.: US 6,804,419 B1
(45) Date of Patent: Oct. 12, 2004

(54) IMAGE PROCESSING METHOD AND APPARATUS

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/434,378

(22) Filed: Nov. 8, 1999

(30) Foreign Application Priority Data

| Nov. 10, 1998 | (JP) | 10-319204 |
| Dec. 25, 1998 | (JP) | 10-371476 |
| Feb. 18, 1999 | (JP) | 11-039579 |
| Jun. 11, 1999 | (JP) | 11-165941 |

(51) Int. Cl.$^7$ .............................................. G06K 9/32
(52) U.S. Cl. ....................... 382/300; 382/107
(58) Field of Search ............................... 382/254, 251, 382/232, 107, 298, 299, 300, 308

(56) References Cited

U.S. PATENT DOCUMENTS

| 5,696,848 A | * 12/1997 | Patti et al. .................. 382/254 |
| 5,822,462 A | 10/1998 | Miyake ....................... 382/251 |

FOREIGN PATENT DOCUMENTS

| JP | 5-260264 | 10/1993 | ............ H04N/1/04 |

OTHER PUBLICATIONS

R. Schultz "Extraction of High Resolution Frames from Video Sequences", IEEE Transactions on Image Processing vol. 5, No. 6, Jun. 1996, p. 996–1011.*
D. Chen et al., "Extraction of High–Resolution Video Stills from MPEG Image Sequences", International Conference On Image Processing, 1998, ICIP 98. Proceedings, Chicago, IL, Oct. 4–7, 1998, pp. 465–469.
R. Schultz et al., "Bayesian Estimation of Subpixel–Resolution Motion Fields and High–Resolution Video Stills", International Conference on Image Processing, 1997. Proceedings Santa Barbara, CA, Oct. 26–29, 1997, pp. 62–65.
U–V Koc et al., "DCT–Based Subpixel Motion Estimation", 1996 IEEE International Conference on Acoustics, Speech, and Signal Processing Proceedings. Atlanta, GA, May 7–10, 1996, vol. 4, Conf. 21, pp. 1930–1933.
U–V Koc et al., "Interpolation–Free Subpixel Motion Estimation Techniques In DCT Domain", IEEE Transactions on Circuits and Systems for Video Technology, IEEE Inc. New York, NY, vol. 8, No. 4, Aug. 1, 1998, pp. 460–487.

* cited by examiner

*Primary Examiner*—Leo Boudreau
*Assistant Examiner*—Tom Y. Lu
(74) *Attorney, Agent, or Firm*—Fitzpatrick, Cella, Harper & Scinto

(57) ABSTRACT

There is disclosed a method for obtaining one high-resolution image from a plurality of low-resolution images having predetermined resolutions, comprising steps of detecting relative positions among the plurality of low-resolution images with a resolution less than a pixel pitch in the predetermined resolutions, and forming a new image having a high resolution as compared with the predetermined resolutions using the plurality of images in accordance with information indicating the relative positions, so that the high-resolution image is obtained without any disorder. Moreover, there is disclosed a method for detecting motion vectors among a plurality of frames with a higher resolution, comprising steps of using orthogonal transform coefficients of images in the plurality of frames in motion images to detect the motion vectors among the plurality of frames with the resolution less than the pixel pitch in the predetermined resolutions.

24 Claims, 33 Drawing Sheets

$J = \text{MIN}(|A-E|, |B-E|, |C-E|, |D-E|) = |X-E|$ (J IS MINIMUM DISTANCE FROM INTERPOLATION POINT TO OBSERVATION POINT.
X REPRESENTS OBSERVATION POINT WHICH RESULTS IN MINIMUM DISTANCE.)

INTERPOLATION POINT E=X

INTERPOLATION POINT $E = (1-i)(1-j)A + i \cdot (i-j)B + j \cdot (1-i)C + ijD$

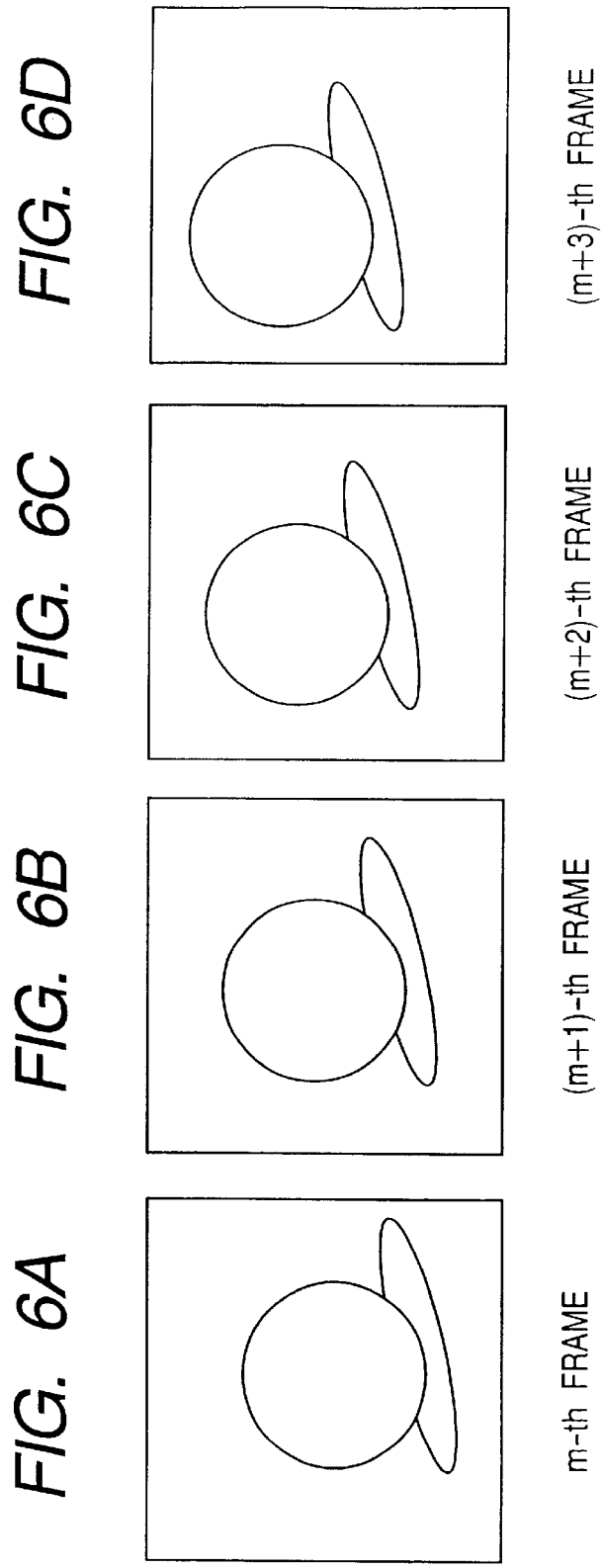

FIG. 7A
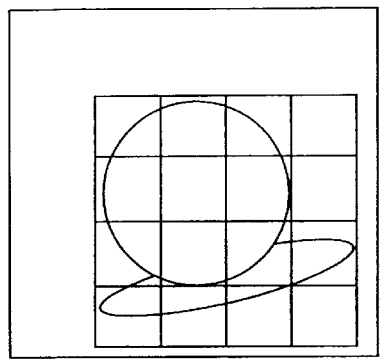
FIG. 7B
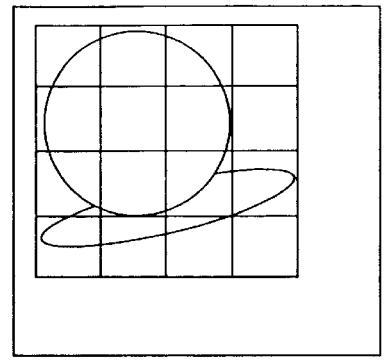
FIG. 7C
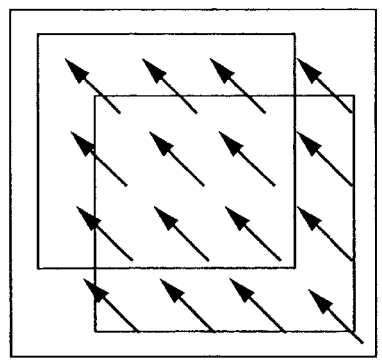
FIG. 8A   FIG. 8B   FIG. 8C
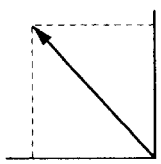  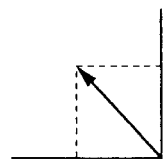

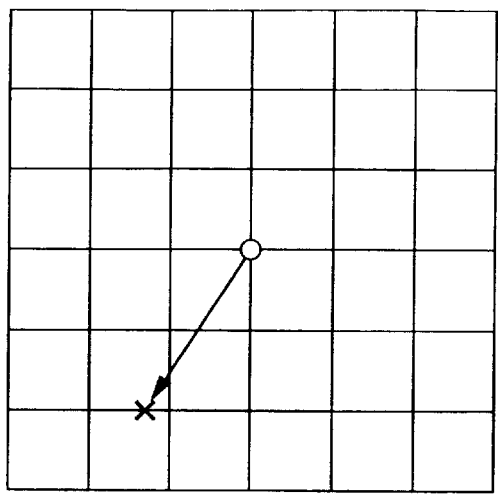
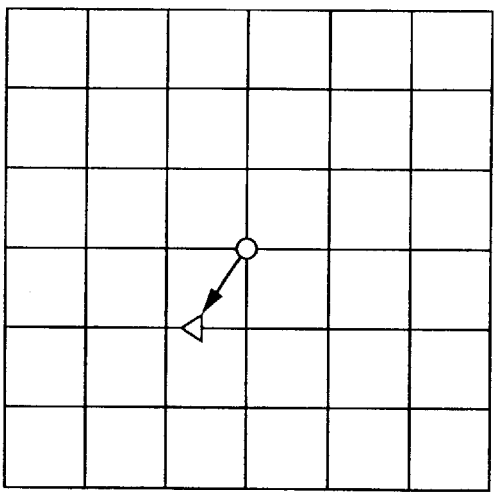
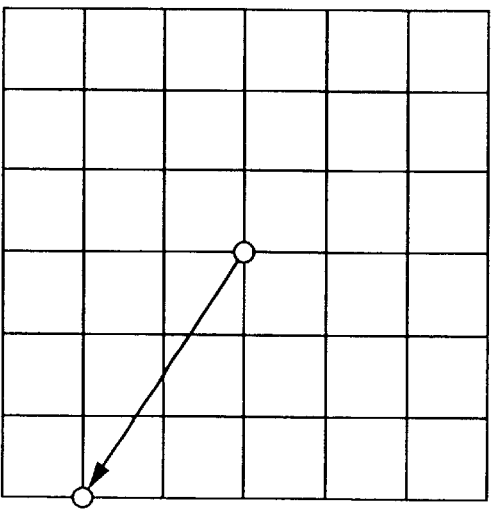

○ : m-th FRAME
△ : (m+1)-th FRAME
✗ : (m+2)-th FRAME

FIG. 20

BLOCK A

IN
| | | | | | | | |
|---|---|---|---|---|---|---|---|
| 63 | 56 | 60 | 54 | 52 | 50 | 46 | 47 |
| 62 | 73 | 73 | 75 | 83 | 90 | 96 | 99 |
| 81 | 91 | 99 | 105 | 112 | 117 | 121 | 120 |
| 102 | 103 | 102 | 103 | 105 | 109 | 110 | 111 |
| 125 | 121 | 116 | 111 | 112 | 110 | 106 | 103 |
| 134 | 140 | 140 | 120 | 110 | 106 | 105 | 101 |
| 137 | 142 | 147 | 137 | 112 | 107 | 105 | 97 |
| 144 | 145 | 145 | 140 | 114 | 106 | 100 | 88 |

~701

DCT
| | | | | | | | |
|---|---|---|---|---|---|---|---|
| 824.50 | 36.37 | −6.21 | −10.28 | −9.75 | 3.45 | 0.68 | −0.24 |
| −157.84 | −80.37 | 7.36 | 9.76 | 4.70 | −8.01 | 1.05 | 2.59 |
| −66.66 | 32.40 | −7.42 | −6.94 | 0.17 | 6.01 | 0.76 | −1.86 |
| −45.08 | 35.71 | 8.77 | 0.01 | −0.79 | −1.72 | 4.12 | 3.75 |
| −34.75 | 22.78 | 2.11 | 9.37 | 7.00 | 2.06 | 1.83 | −0.83 |
| −9.14 | 8.40 | −2.99 | −4.30 | 0.91 | 3.82 | 2.45 | −0.25 |
| 4.34 | 7.21 | −3.24 | −0.46 | −0.88 | 0.00 | 1.42 | 2.25 |
| 7.66 | −0.48 | −6.23 | 2.47 | 2.52 | 2.11 | 0.42 | 0.04 |

BLOCK B'

IN
| | | | | | | | |
|---|---|---|---|---|---|---|---|
| 65 | 54 | 59 | 56 | 52 | 50 | 46 | 45 |
| 57 | 73 | 72 | 75 | 82 | 87 | 95 | 99 |
| 80 | 87 | 98 | 105 | 110 | 115 | 121 | 122 |
| 102 | 103 | 102 | 103 | 105 | 109 | 110 | 111 |
| 127 | 124 | 116 | 111 | 112 | 110 | 107 | 103 |
| 132 | 140 | 142 | 124 | 112 | 106 | 105 | 101 |
| 136 | 140 | 148 | 140 | 116 | 107 | 105 | 97 |
| 144 | 145 | 146 | 141 | 114 | 106 | 103 | 86 |

~711

DCT
| | | | | | | | |
|---|---|---|---|---|---|---|---|
| 824.50 | 35.50 | −9.34 | −12.17 | −8.25 | 5.78 | −1.00 | 0.11 |
| −162.46 | −80.86 | 9.85 | 9.29 | 5.72 | −8.08 | 1.59 | 1.36 |
| −67.59 | 32.17 | −9.69 | −6.17 | 0.37 | 8.03 | 0.26 | −1.26 |
| −42.10 | 37.82 | 6.31 | 0.84 | 0.07 | −2.33 | 3.76 | 2.95 |
| −32.75 | 25.75 | 4.94 | 13.23 | 5.00 | 3.22 | 1.47 | −1.08 |
| −8.12 | 7.79 | −4.68 | −2.64 | 3.71 | 5.04 | 4.64 | 0.45 |
| 4.72 | 6.92 | −2.74 | −0.36 | −0.42 | 2.69 | 2.69 | 1.94 |
| 8.08 | −0.45 | −4.05 | 3.94 | 3.89 | 3.05 | 1.09 | 0.48 |

~712

BLOCK C

IN
```
 54   59   56   52   50   46   45   53
 73   72   75   82   87   95   99   99
 87   98  105  110  115  121  122  116
103  102  103  105  109  110  111  112
124  116  111  112  110  107  103  103
140  142  124  112  106  105  101   99
140  148  140  116  107  105   97   96
145  146  141  114  106  103   86   88
```
~721

DCT
```
 814.87   41.46    6.37   -1.61   -8.62   -6.73    2.64   -1.23
-134.83  -84.34   -9.12    1.20    8.46    5.17   -4.66   -0.43
 -76.47   32.76    2.83   -8.35   -5.58   -5.23    4.65    0.58
 -53.76   28.31   12.19   -0.17    4.16   -1.87   -3.50   -1.91
 -43.62   15.13    0.25   -0.37    7.37   -1.11    3.55    1.19
 -10.64    7.16   -1.27   -7.14   -4.25   -3.27   -1.08    1.03
   1.23    8.44   -2.35   -0.80   -2.69   -2.52   -1.58   -0.93
   5.79    1.30   -7.72   -2.39   -1.03    0.45    0.45    0.29
```
~722

FIG. 29

BLOCK A

IN
```
188  192  191  192  192  198  197  164
191  190  192  197  196  189  114   69
192  197  205  204  188   88    5   40
189  193  197  187  102    0   48  104
190  195  190  101   13   51  117  164   ~731
206  203  146   54   45  108  170  202
199  183  118   51   68  145  204  200
198  171   40    0  123  199  196  187
```

DCT
```
1178.50  174.46  147.27  -12.12  -29.50  -21.41    0.15    2.15
  92.83  131.72 -256.40  -41.94   56.76   19.60    5.99   -4.24
 112.98 -170.64   -1.32  167.87  -44.20  -24.42   -5.76   -2.32
  55.63  -81.43  113.39  -45.84  -60.88   41.36    5.36   -2.86   ~732
 -11.25  -30.26   40.44  -27.04    9.25    9.59  -15.40    2.65
   9.15   10.76   -4.63  -43.49   30.41   10.50  -18.86   10.41
  -1.61    5.93   -2.01   14.76   14.79  -31.30    2.57    4.72
  -4.93    7.42   -2.74   -9.43  -10.99    1.66   15.49   -3.37
```

FIG. 30

BLOCK B'

IN
```
188  186  189  192  190  199  206  155
190  187  186  196  205  198  125   62
191  198  201  199  192   80    0   36
191  193  199  188   85    0   26   85
186  200  198   99    0   36  109  161   ~741
193  204  151   47   35  106  167  209
203  190  120   37   48  152  206  193
204  176   31    0  103  204  204  188
```

DCT
```
1159.75  184.32  155.88  -11.60  -47.00  -15.20    2.00   -5.70
  95.65  128.49 -276.11  -31.39   68.09   20.30   -0.33    8.22
 127.18 -187.82    5.86  185.38  -49.36   13.25  -13.25   -3.28
  55.92  -88.27  112.67  -57.29  -66.87   40.80    7.49    3.80   ~742
 -17.00  -18.24   40.78  -31.54   11.75   19.71  -13.91   -5.83
   0.37   22.37   -3.90  -38.99   24.69   11.59   -9.66    6.42
  -2.62   -1.38   -1.25    5.44   22.61   35.64   -0.86    7.18
  -4.41   10.93    4.07  -13.99   -9.83    0.43    9.39    4.71
```

FIG. 31

BLOCK C

IN

| | | | | | | | |
|---|---|---|---|---|---|---|---|
| 186 | 189 | 192 | 190 | 199 | 206 | 155 | 125 |
| 187 | 186 | 196 | 205 | 198 | 125 | 62 | 26 |
| 198 | 201 | 199 | 192 | 80 | 0 | 36 | 26 |
| 193 | 199 | 188 | 85 | 0 | 26 | 85 | 139 |
| 200 | 198 | 99 | 0 | 36 | 109 | 161 | 207 |
| 204 | 151 | 47 | 35 | 106 | 167 | 209 | 208 |
| 190 | 120 | 37 | 48 | 152 | 206 | 193 | 189 |
| 176 | 31 | 0 | 103 | 204 | 204 | 188 | 190 |

~751

DCT

| | | | | | | | |
|---|---|---|---|---|---|---|---|
| 1105.25 | 88.47 | 157.01 | 82.13 | 14.00 | −10.74 | −4.42 | 4.15 |
| 44.91 | 277.30 | −173.52 | −147.21 | −37.66 | 16.85 | −0.88 | −4.08 |
| 117.77 | −124.26 | −186.44 | 141.08 | 69.55 | 5.52 | 7.14 | 1.86 |
| 92.27 | −122.98 | 90.11 | 69.97 | −62.01 | −44.14 | 4.46 | −3.70 |
| 10.50 | −64.81 | 63.27 | −21.57 | −13.25 | −2.99 | 26.02 | −1.41 |
| 4.62 | 11.15 | 29.11 | −36.68 | −23.73 | 10.80 | 8.41 | −7.89 |
| −1.16 | −3.39 | 0.64 | −10.89 | 22.88 | 28.72 | −19.56 | −4.13 |
| −5.17 | 10.38 | 13.33 | 2.06 | −7.98 | −9.66 | −9.53 | −2.07 |

BLOCK D

IN

| | | | | | | | |
|---|---|---|---|---|---|---|---|
| 190 | 187 | 186 | 196 | 205 | 198 | 125 | 62 |
| 191 | 198 | 201 | 199 | 192 | 80 | 0 | 36 |
| 191 | 193 | 199 | 188 | 85 | 0 | 26 | 85 |
| 186 | 200 | 198 | 99 | 0 | 36 | 109 | 161 |
| 193 | 204 | 151 | 47 | 35 | 106 | 167 | 209 |
| 203 | 190 | 120 | 37 | 48 | 152 | 206 | 193 |
| 204 | 176 | 31 | 0 | 103 | 204 | 204 | 188 |
| 201 | 147 | 6 | 17 | 170 | 203 | 192 | 194 |

~761

DCT

| | | | | | | | |
|---|---|---|---|---|---|---|---|
| 1112.87 | 152.42 | 204.74 | 33.09 | −35.87 | −42.65 | −1.87 | −4.76 |
| 13.94 | 252.09 | −253.98 | −143.28 | 57.57 | 34.94 | 17.40 | 1.36 |
| 67.89 | −66.93 | −139.90 | 193.03 | 42.96 | −47.76 | −16.71 | 2.11 |
| 76.27 | −74.98 | 30.88 | 55.43 | −80.00 | 11.95 | 12.74 | −4.64 |
| 32.13 | −63.77 | 33.48 | 9.95 | −26.62 | 5.53 | 6.02 | 3.31 |
| −0.59 | −23.71 | 34.72 | 1.93 | −34.59 | 29.50 | −1.50 | −14.80 |
| 10.71 | −3.75 | −2.21 | −17.80 | 3.45 | 30.85 | −7.85 | 0.21 |
| 3.40 | −12.66 | 2.94 | 12.87 | 10.50 | −7.93 | −9.35 | −4.52 |

BLOCK E

IN
```
187  186  196  205  198  125   62   26
198  201  199  192   80    0   36   26
193  199  188   85    0   26   85  139
200  198   99    0   36  109  161  207
204  151   47   35  106  167  209  208    ~771
190  120   37   48  152  206  193  189
176   31    0  103  204  204  188  190
147    6   17  170  203  192  194  190
```

DCT
```
1064.87    21.17   166.91   104.78    56.88     8.46    -8.93    2.86
 -38.30   363.34   -46.29  -191.47   -85.73   -11.08    -7.63    4.04
  25.79    35.66  -258.59    17.45   105.41    54.02    -3.35   -1.00
  64.99   -34.36   -58.78   112.50    -2.63   -35.73    -7.98    7.79    ~772
  45.38   -64.19    -1.94    39.81    -6.12   -13.21    -5.01   -1.45
  10.13   -40.76    21.58    30.50   -10.73   -31.98    23.54    9.04
  14.89    -7.03     5.65   -12.65   -26.75    -8.72    19.84   -3.30
   6.33   -16.23    -5.69    -0.32    12.47    13.50     5.81    2.14
```

FIG. 34

BLOCK K

DCT
```
1134.81   150.17   165.94    21.62   -29.50   -21.41     0.15    2.15
  62.44   194.24  -238.36   -84.09    56.76    19.60     5.99   -4.24
 107.96  -139.26   -74.05   168.01   -44.20   -24.42    -5.76   -2.32
  67.11   -88.91    82.38    -1.68   -60.88    41.36     5.36   -2.86
 -11.25   -30.26    40.44   -27.04     9.25     9.59   -15.40    2.65    ~781
   9.15    10.76    -4.63   -43.49    30.41    10.50   -18.86   10.41
  -1.61     5.93    -2.01    14.76    14.79   -31.30     2.57    4.72
  -4.93     7.42    -2.74    -9.43   -10.99     1.66    15.49   -3.37
```

OUT
```
184  189  192  197  196  190  168  119
190  191  192  190  179  166   93   52
195  199  199  182  152   58    0   54
196  190  179  157   72    0   57  130    ~782
198  182  159   74    8   65  136  179
207  184  114   38   61  140  189  201
190  163   96   46   88  172  215  191
180  154   29    2  137  214  199  178
```

IMAGE PROCESSING METHOD AND APPARATUS

BACKGROUND OF THE INVENTION

1. Field of the Invention

The present invention relates to image processing method and apparatus, particularly to method and apparatus for forming a high-resolution image from a low-resolution image, motion vector detecting method and apparatus for use together with the image processing apparatus, method and apparatus for synthesizing a plurality of images, further to a recording medium readable by a computer which is used in these methods and apparatuses, and the like.

2. Related Background Art

Various methods have been heretofore proposed as methods for converting the resolution from inputted low-resolution information to high-resolution information.

In the conventional proposed resolution converting methods, a high resolution is realized by interpolating pixels to the low-resolution information, and the conversion processing method differs with the type of the object image (e.g., a multivalued image in which each pixel has gradation information, a binary image binarized by a pseudo intermediate gradation, a binary image binarized by a fixed threshold value, a character image, and the like).

As the pixel interpolating method in the conventional resolution converting method, a closest interpolating method of arranging the same pixel value closest to an interpolation point as shown in FIG. 1, a common primary interpolating method of determining the pixel value of an interpolation point E by the following operation in accordance with the distances of four points (four point pixel values are set to A, B, C, D) surrounding the interpolation point as shown in FIG. 2, and the like are generally used.

$$E=(1-i)(1-j)A+i(1-j)B+j(1-i)C+ijD \quad (1)$$

(when the distance between pixels is set to 1, the interpolation point E has a distance i in a transverse direction and a distance j in a vertical direction from A (i≦1, j≦1)).

Moreover, as heretofore represented by a sampling theorem, means for converting a sampled discrete signal to a continuous signal comprises passing the signal through an ideal low pass filter which can be represented by SINC function, so that the continuous signal can be reproduced. Moreover, since the operation of SINC function requires much processing time, there is proposed another method which comprises approximating the interpolation function represented by the SINC function, and calculating an interpolated value only by a simple operation of sum of products.

For example, in a known cubic convolution interpolating method, the approximating of the interpolation function can be realized. A method of calculating the interpolated value by the interpolating method will be described with reference to FIG. 3. In the pixel arrangement shown in FIG. 3, P denotes an interpolated point (interpolation point), and P11 to P44 denote pixel values of 16 pixels surrounding the point. Then, the interpolation point is interpolated using a cubic convolution function shown in the following equation. Additionally, in the following equation, x^y represents y power of x.

$$P = [f(y1)f(y2)f(y3)f(y4)] \begin{bmatrix} P11 & P12 & P13 & P14 \\ P21 & P22 & P23 & P24 \\ P31 & P32 & P33 & P34 \\ P41 & P42 & P43 & P44 \end{bmatrix} \begin{bmatrix} f(x1) \\ f(x2) \\ f(x3) \\ f(x4) \end{bmatrix} \quad (2)$$

$$f(t) = \sin(\pi t)/(\pi t) \cong \begin{bmatrix} 1 - 2|t|^2 + |t|^3 & (0 \le |t| < 1) \\ 4 - 8|t| + 5|t|^2 - |t|^3 & (1 \le |t| < 2) \\ 0 & (2 \le |t|) \end{bmatrix} \quad (3)$$

$x1=1+(u-[u])$ $y1=1+(v-[v])$ $x2=(u-[u])$ $y2=(v-[v])$ $x3=1-(u-[u])$ $y3=1-(v-[v])$ $x4=2-(u-[u])$ $y4=2-(v-[v])$ (4)

(In the equation, [ ] denotes Gauss' notation, and takes an integer portion.)

However, as a result of resolution conversion by the above-described three types of interpolating methods, a blur by interpolation, and a block-shaped jaggy dependent on input low-resolution image occur, and high quality and resolution information cannot be prepared.

To prepare the high-resolution information from the low-resolution information in such background, there is also proposed an interpolating method including a technique of realizing the resolution conversion without generating the interpolation blur attributed to the interpolating processing or the jaggy, a technique of preparing an excellent edge while maintaining the continuity of pixel values, and the like.

However, the resolution conversion by the above-described conventional interpolating method has the following defect. Specifically, even if the high-resolution information is prepared, the enhancement of image quality is limited.

As apparent from the sampling theorem, since the information with the input resolution equaling or exceeding Nyquist limit does not exist in the input image, the preparation of information with Nyquist frequency or more frequency is all based on presumption. Therefore, it is easy to convert flat artificial images such as not-complicated CG image, illustration image, and animation image to jaggy-less images, but it is difficult to enhance the image quality of a natural image by presuming the information equaling or exceeding the Nyquist limit. Specifically, even if any method is used, the image quality of the image obtained by inputting low-resolution information and converting the resolution to a high resolution is evidently deteriorated as compared with the image inputted originally as the high-resolution information.

On the other hand, with the spread of digital video cameras in recent years, it becomes easy to input the picked-up motion image into a computer in the unit of continuous one frame. Therefore, one frame of motion image can also be outputted via a printer. However, as compared with the yearly increasing output resolution of the printer, the input resolution of a picking up system tends to increase, but it is still low in the present situation.

Therefore, as described above in the conventional example, instead of preparing one frame of high-resolution still image from one frame of low-resolution still image, it is considered that one frame of high-resolution still image is prepared from a plurality of continuous low-resolution still images taken from the motion image.

The technique of preparing the high-resolution still image from the low-resolution motion image is proposed in Japanese Patent Application Laid-Open No. 05-260264. The proposed method comprises comparing images continuous in point of time, detecting parameters of affine transformation and parallel movement based on the difference of the images, and synthesizing these images. Additionally, an example in which the synthesizing method is utilized for interpolation is also mentioned.

However, this proposal has the following problem:

Specifically, in the method of utilizing the synthesizing method for the interpolation, by comparing the continuous images enlarged by the interpolating method shown in FIGS. 1 to 3, the parameters are calculated to determine an interpolation position, before performing the synthesis. However, for the enlarged image obtained by the interpolation in this manner, new high-resolution information is not prepared by the interpolating operation itself. Therefore, even when the synthesis processing is performed using the enlarged image in this manner, a really high-resolution image is not necessarily obtained.

Here, the interpolation indicates the interpolation between the pixels. In the interpolation by the synthesizing method, however, when the continuous images are compared, there is not information between the pixels for creating the resolution higher than the resolution of the input pixel. In other words, assuming that two types of images A and B are synthesized, it is difficult to determine the position between the pixels of the image A in which the pixel of the image B is to be interpolated, only by comparing the enlarged images.

This is because the minimum unit of the motion vector amount corresponds to a pixel unit, and there is no resolution finer than a distance between pixels. Specifically, if the vector resolution does not have a precision equal to or less than the distance between the pixels, the effect resulting from the interpolation using a plurality of still images is diminished, and the image quality is substantially unchanged as compared with when one frame of high-resolution still image is prepared from one frame of low-resolution still image as described above in the conventional example.

SUMMARY OF THE INVENTION

An object of the present invention is to solve the above-described problems.

Another object of the present invention is to provide an image processing method in which one high-resolution image can be obtained from a plurality of low-resolution images.

To achieve the objects, according to one aspect of the present invention, there is provided an image processing method comprising steps of inputting a plurality of mutually different images having predetermined resolutions, detecting relative positions among the plurality of images with a resolution less than a pixel pitch in the predetermined resolutions, and forming a new image having a high resolution as compared with the predetermined resolutions using the plurality of images in accordance with information indicating the relative positions obtained in the detecting step.

Further object of the present invention is to provide a method in which a motion vector among a plurality of frames can be detected with a higher resolution.

To achieve the object, according to another aspect of the present invention, there is provided an image processing method comprising steps of extracting a plurality of frames from motion images having predetermined resolutions, calculating orthogonal transform coefficients of each of images in the plurality of frames, and detecting motion vectors among the plurality of frames with a resolution less than a pixel pitch in the predetermined resolutions by using the orthogonal transform coefficients.

Still another object of the present invention is to provide an image processing method in which by synthesizing a plurality of images, an image having a high resolution and having no disorder can be formed.

To achieve this object, according to further aspect of the present invention, there is provided an image processing method comprising steps of inputting a plurality of mutually different images having predetermined resolutions, calculating orthogonal transform coefficients of each of the plurality of images, and shifting and synthesizing the plurality of images with a resolution less than a pixel pitch in the predetermined resolutions by using the orthogonal transform coefficients.

Moreover, according to another characteristic of the present invention, there is provided an apparatus or a device which uses the above-described image processing method.

Furthermore, according to another characteristic of the present invention, there are provided a program for realizing the above-described image processing method and a recording medium readable by a computer which stores the program.

The objects and characteristics of the present invention other than the above-described will be apparent from the following detailed description of the mode of the present invention.

BRIEF DESCRIPTION OF THE DRAWINGS

FIGS. 6A, 6B, 6C and 6D are schematic views showing one example of an actual image motion to be handled in the apparatus of FIG. 4.

FIGS. 7A, 7B and 7C are explanatory views showing the states of motion vectors extracted from the images shown in FIGS. 6A to 6D.

FIGS. 8A, 8B and 8C are diagrams showing that the motion vector shown in FIG. 7C is divided.

FIGS. 10A, 10B and 10C are schematic views showing in more detail that the motion vectors shown in FIGS. 8A to 8C are divided.

FIGS. 18, 19A and 19B, 20, 21, 22 and 23 are explanatory views showing the detail of the processing shown in the flowchart of FIG. 17.

FIGS. 29, 30, 31, 32, 33 and 34 are diagrams showing examples of actual image data processed in FIG. 28.

FIG. 41 is a schematic diagram showing the interpolation point for use in the processing unit of FIG. 40.

DETAILED DESCRIPTION OF THE PREFERRED EMBODIMENTS

Only some embodiments of the present invention will be described hereinafter with reference to the drawings.

Additionally, it is efficient to dispose an image processing method/apparatus of the present invention mainly inside an analog or digital video camera for picking up motion images, or inside image output apparatuses such as a printer and a video printer connected directly or via a computer to the video camera. Moreover, the present invention can be incorporated as an image processing apparatus constituting an intermediate adapter in the connection of the video camera and the printer, as application software in a host computer, or a printer driver software for transmitting outputs to the printer.

Figure 4:
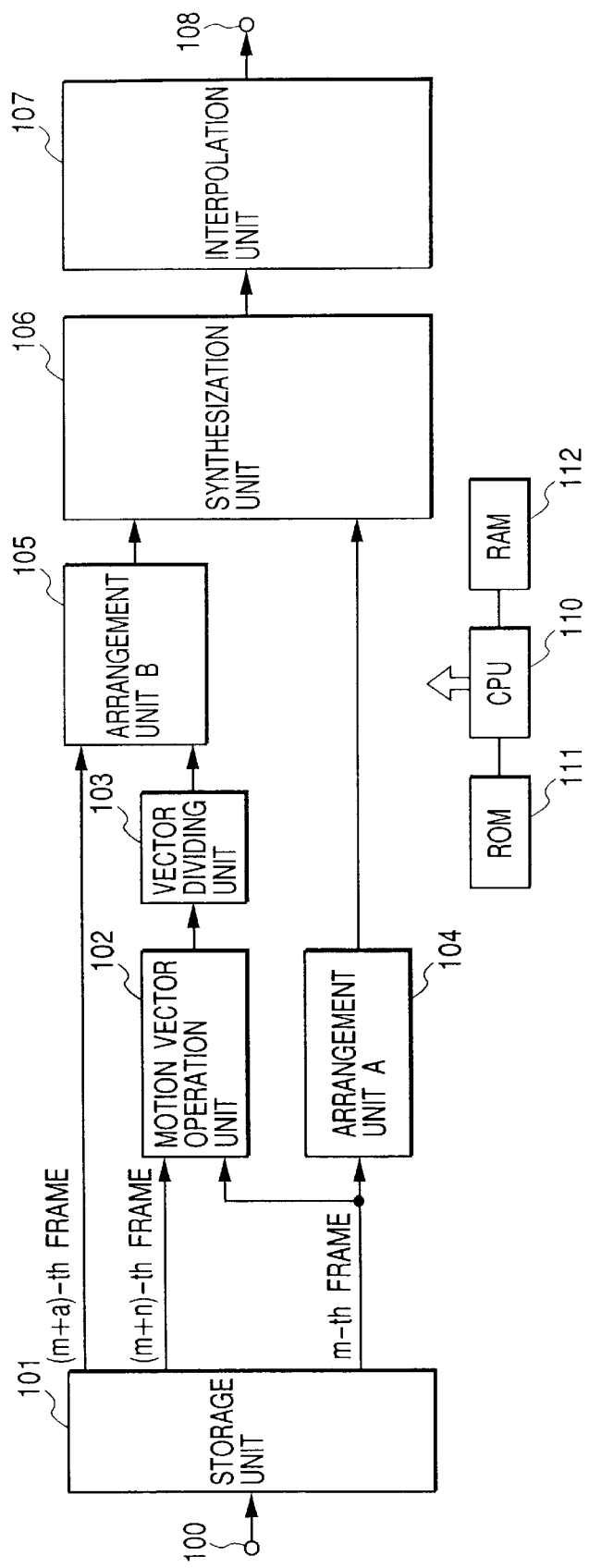
FIG. 4 is a block diagram showing an image processing apparatus according to a first embodiment of the present invention.

FIG. 4 is a block diagram showing the functional constitution of a computer as an image processing apparatus according to a first embodiment of the present invention. The operation procedure will now be described with reference to FIG. 4. Additionally, in the embodiment, an example will be described in which the image picked-up by a digital video camera is transmitted to a computer, and transformed to provide a resolution corresponding to that of a printer by application software in the computer.

FIG. 4 shows a block diagram of a function of a computer presented as an image processing apparatus of the first embodiment of the present invention. Hereinafter, an operation sequence of the computer is explained in reference to FIG. 4. In this embodiment, it is explained as an example that an image picked up by a digital video camera is transmitted to the computer and then converted into an image of resolution corresponding to that of a printer by an application software stored in the computer.

In FIG. 4, numeral 100 denotes an input terminal via which the motion image picked-up by the video camera is transmitted into the computer. A user reproduces the motion images picked-up by the digital video camera from a recording medium, and sends an image pickup command in a desired scene. A plurality of continuous frames of image information immediately after the pickup command is issued are stored in a storage unit 101 in the computer in synchronization with the pickup command. A motion vector operation unit 102 is means which measures the movement amount of partial movement as a vector based on the difference of two types of images. Additionally, the motion vector operation unit 102 will be described later in detail. Numeral 103 denotes a vector dividing unit for dividing the calculated vector into a plurality of vectors, and the detail thereof will be described later.

Numeral 104 denotes an arrangement unit A to control the pixel arrangement of the picked-up images. Moreover, an arrangement unit B 105 controls the pixel arrangement to be interpolated to the image with the pixels arranged by the arrangement unit A 104 in accordance with the amount of vectors divided by the vector dividing unit 103. A synthesizing unit 106 synthesizes the images with their pixels arranged by the arrangement units A 104 and B 105. An interpolation unit 107 calculates unfilled information of interpolation point by the interpolating operation when the image synthesized in the synthesizing unit 106 is not filled with the information of the interpolation point up to a desired resolution. When the interpolation unit 107 generates sufficient pixels to achieve the desired resolution, high resolution is achieved in the embodiment. Numeral 108 denotes an output terminal via which the image information with an enhanced resolution is transmitted to the printer, and the like.

Numeral 110 denotes CPU which controls the operation of each constitution described above in a generalizing manner in accordance with the control program held in ROM 111, and RAM 112 is used as the operation area of the CPU 110.

A processing in the motion vector operation unit 102 will next be described in detail.

Various methods for calculating the motion vector have been proposed, but a method using so-called template matching will be described hereinafter.

Figure 5:
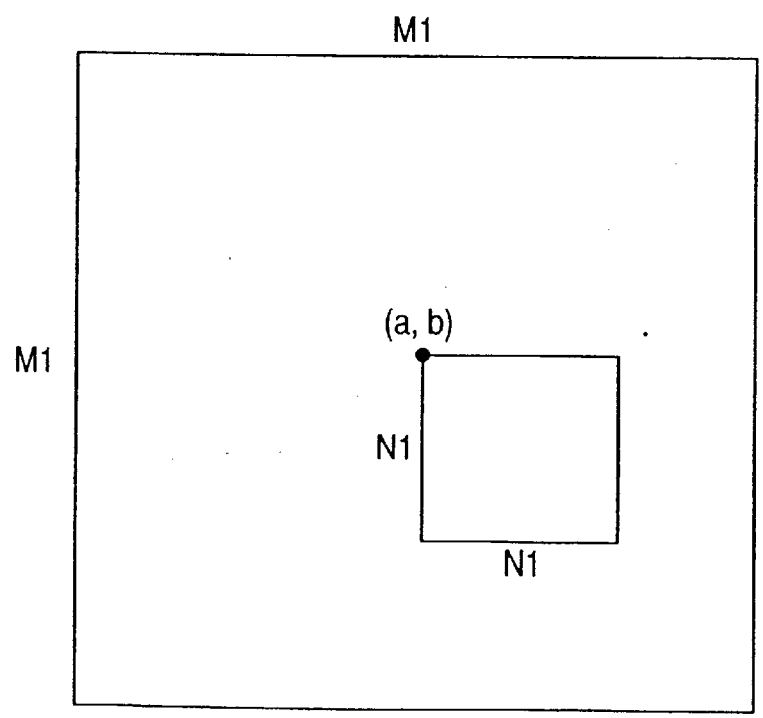
FIG. 5 is a schematic view showing motion vector operation in the apparatus of FIG. 4.

As shown in FIG. 5, a template or a block having N1×N1 pixels is moved on a search range $(M1-N1+1)^2$ in a larger input image with M1×M1 pixels, and the left upper position of a template image is obtained in which the residual represented by the following equation (5) is minimum. In this case, matching is regarded as having been achieved.

$$R(a,b)=\Sigma\Sigma|I(a,b)(m1,n1)-T(m1,n1)| \quad (5)$$

(In the equation, the left $\Sigma$ is in the range of m1=0 to N1−1, and the right $\Sigma$ is n1=0 to N1−1.)

Additionally, in the equation (5), (a, b) indicates the left upper position of the template image in the input image, I(a, b)(m1, n1) indicates the partial image of the input image, and T(m1, n1) is the template image.

In this case, when the matching deviates, the residual is rapidly increased during serial addition of the pixels. To solve the problem, a residual sequential testing method comprises judging that the matching is insufficient when the residual exceeds a certain threshold value during the addition shown in the equation (5) to stop the addition, and shifting to the next operation of (a, b).

Specifically, when it is assumed that two types of images are continuous images on animation, by using the above-described method, the geometric deviation between both images can easily be quantitatively determined.

As the motion vector operation method, a higher-precision method has also been proposed, but to facilitate the description, the above-described method by the template matching is used in the embodiment.

Additionally, for the motion vector by the template matching, the matching in which the residual is minimum is detected, and the resolution of the vector is a pixel unit as described above. Specifically, no resolution finer than the distance between pixels is provided. It is very effective to use the template matching as motion compensation during coding, but for the application to the interpolation, that is, the interpolating technique of filling the information between the pixels, a finer resolution is necessary.

Therefore, in the embodiment, instead of calculating the motion vector of two types of continuous images, the motion vector of two types of images apart from each other in sampling time is calculated.

Specifically, for two types of images transmitted to the motion vector operation unit 102 from the storage unit 101, one image is a certain image (hereinafter referred to as the m-th frame) immediately after the user issues the pickup command, and the other image is n-th frame after the m-th frame (hereinafter referred to as the (m+n)-th frame, n>1). An example of n=3 will now be described. In the motion vector operation unit 102, the generation of vector movement is detected between m-th frame image and (m+3)-th frame image. Of course, the resolution of the motion vector calculated at this time is a pixel unit, and is equal to a pixel pitch.

The processing in the vector dividing unit 103 will next be described in detail.

The vector dividing unit 103 is constituted of a divider which performs division with a value of n to convert the vector amount moved among the n frames to the vector amount per frame based on the motion vector amount calculated in the motion vector operation unit 102.

As described above, one characteristic of the embodiment lies in that the resolution of the motion vector is set to be finer than the between-pixel distance (pitch) to perform the interpolation. In the embodiment, it is assumed that the motion vector completely linearly moves in point of time. When the motion vector linearly moves in this manner, by calculating the motion vector at time intervals of a plurality of frames and converting the vector amount to the amount per frame, the vector finer than the between-pixel pitch can be calculated among the continuous frames.

Additionally, since the embodiment is established based on the above-described assumption, the following slight restriction applies. Specifically, when the amount of the motion vector among the n frames is excessively large as compared with the value of n, the precision of the vector amount per frame is deteriorated in some cases.

When the object image is not a rapidly moving image such as sport scene, but is a relatively less moving image of commemorative picking-up, scenery, plant, still life, or the like, the absolute movement amount is small in many blocks of the image. Then, in the motion vector detecting method by the template matching shown in FIG. 5, the motion amount naturally differs with the block unit. Therefore, it is considered that the block having a larger movement amount than a predetermined value is constituted not to be divided.

Pixel Arrangement Outline

The arrangement unit A 104 arranges m-th frame pixels, and the arrangement unit B 105 arranges interpolation pixels to the m-th frame image in accordance with the vector dividing amount. Specifically, the frame inputted to the arrangement unit B 105 is m+a-th frame (a=1 to (n−1)), (n−1) frame pixels are serially inputted, and the pixel values of the interpolation pixels are arranged in accordance with the dividing amount.

In this case, the dividing amount transmitted from the vector dividing unit 103 is 1/n of the motion vector, which is multiplied by a in the arrangement unit B 105. Specifically, the motion vector ×(a/n) indicates the arrangement position when the (m+a)-th frame is inputted.

Here, in the example of n=3, since the arrangement unit B 105 receives ⅓ as the dividing amount of the motion vector, ⅓ of the motion vector is arranged in the (m+1)-th frame, and ⅔ of the motion vector is arranged in the (m+2)-th frame.

FIGS. 6A to 6D are diagrams showing examples of actual image motion. In the example a picked-up object (or a camera) gradually moves in an oblique direction. FIGS. 6A to 6D show m-th to (m+3)-th frame images, respectively.

FIGS. 7A to 7C show the states of the motion vector in the example shown in FIGS. 6A to 6D. FIG. 7A shows the m-th frame image, and FIG. 7B shows the (m+3)-th frame image. Here, the images shown in FIGS. 7A, 7B are used as two types of images for calculating the motion vector. In FIGS. 7A to 7C, the blocks surrounding the object are used as the blocks for calculating the motion vector, and correspond to N1×N1 blocks shown in FIG. 5. Additionally, to facilitate the description, it is assumed that the motion vector is common to all blocks. The motion vector obtained from FIGS. 7A, 7B is shown in FIG. 7C.

FIGS. 8A to 8C show the states of division of the motion vector shown in FIG. 7C. FIG. 8A shows the calculated motion vector for three frames, FIG. 8B shows the dividing of the vector of FIG. 8A to ⅓, and FIG. 8C shows the dividing of the vector of FIG. 8A to ⅔. Specifically, since the vector amount shown in FIG. 8A moves for three frames, the vector is divided by the number of frames.

Figure 9D:
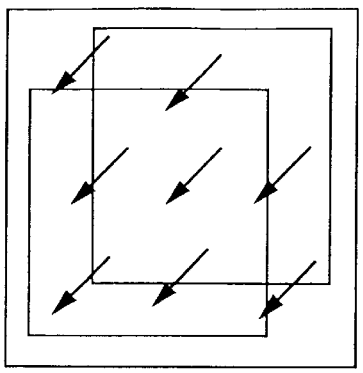
FIGS. 9A, 9B, 9C and 9D are diagrams showing that the motion vectors divided as shown in FIGS. 8A to 8C are used to shift image blocks.
Figure 9C:
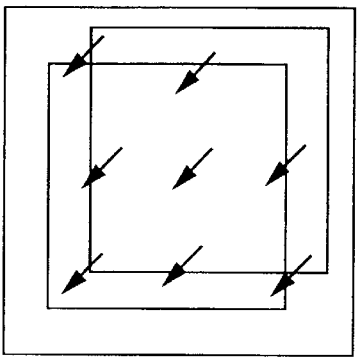
Figure 9B:
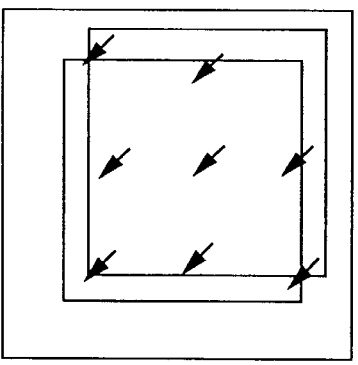
Figure 9A:
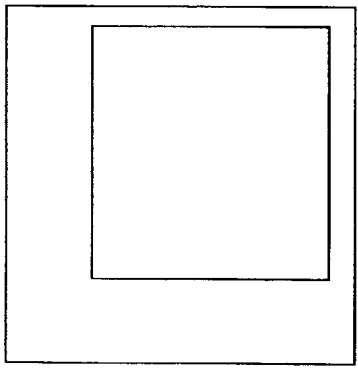

FIGS. 9A to 9D show the states of movement of the block in accordance with the vector dividing amount calculated as shown in FIGS. 8A to 8C. FIG. 9A shows the image which does not move at all, FIG. 9B shows the image whose vector amount is moved by ⅓, FIG. 9C shows the image whose vector amount is moved by ⅔, and FIG. 9D shows the image whose vector amount is moved by 1. Here, FIGS. 9A to 9D correspond to FIGS. 6A to 6D, respectively. However, FIGS. 9B, 9C do not completely correspond to FIGS. 6B, 6C. As described above, since the embodiment is based on the assumption that the motion vector is linear to a time axis (for a short time, and when the movement distance is minute), the positions of FIGS. 9B and 9C are only estimated.

The pixel arrangement in the embodiment will be described hereinafter in more detail.

FIGS. 10A to 10C are diagrams showing the states of vector division in detail, and intersection points of vertical and horizontal straight lines indicate pixel positions. An arrow connecting circle marks in FIG. 10A indicates the motion vector calculated among the images of the m-th frame and (m+n)-th frame. The presumed case of n=3 will be described hereinafter.

The motion vector shown in FIG. 10A moves to the left by three pixels and upward by two pixels. Specifically, the vector movement for three frames is shown by the arrow. An arrow connecting circle and triangle marks in FIG. 10B shows the amount of the vector moved by ⅓. Specifically, it is assumed that the pixel of the circle mark moves to the triangle mark in the (m+1)-th frame. Similarly, an arrow connecting circle and cross marks in FIG. 10C shows the amount of the vector of FIG. 10A moved by ⅔. Specifically, it is assumed that the pixel of the circle mark moves to the cross mark in the (m+2)-th frame.

Figure 11:
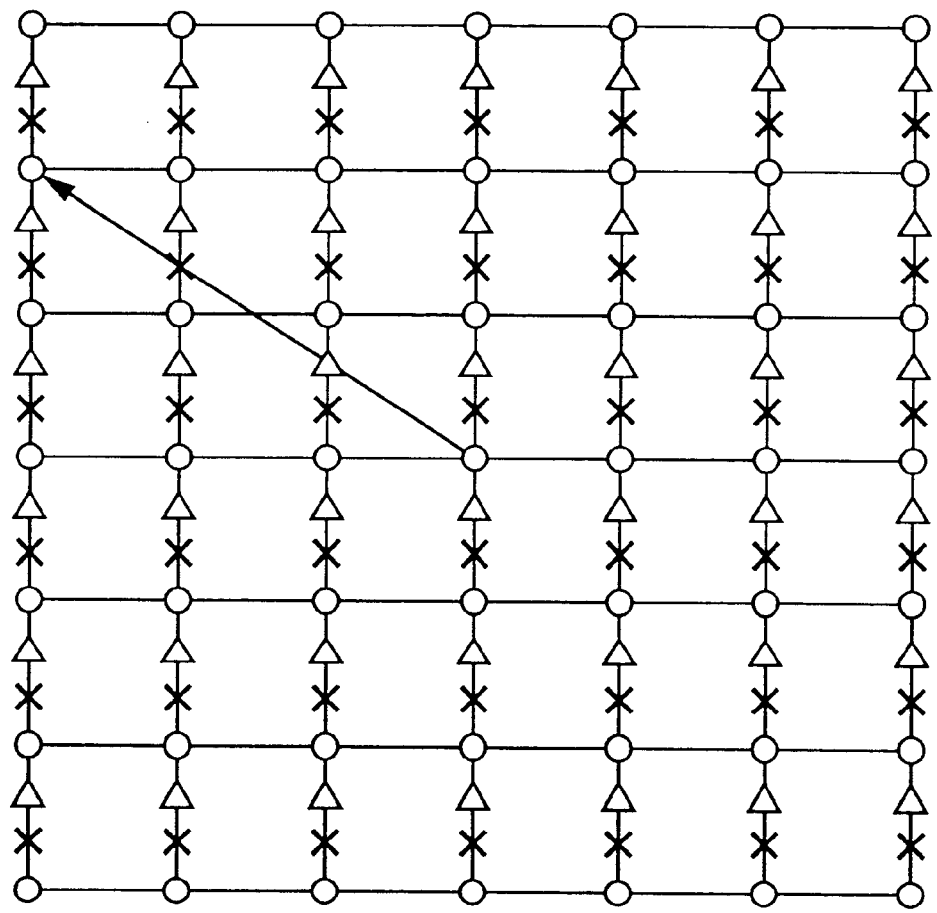
FIG. 11 is a schematic view showing that a plurality of frames of images are synthesized based on divided vector amounts shown in FIGS. 10A to 10C.

FIG. 11 shows a state in which three frame information of m-th frame, (m+1)-th frame, and (m+2)-th frame are arranged and synthesized based on the dividing vector amounts shown in FIGS. 10A to 10C. Specifically, the m-th frame information (circle marks) is arranged without any movement amount, the (m+1)-th frame information (triangle marks) is arranged in the position where the vector moves by ⅓, and the (m+2)-th frame information (cross marks) is arranged in the position where the vector moves by ⅔. By controlling the arrangement in this manner, the interpolation among the pixels can be executed as shown in FIG. 11.

Figure 1:
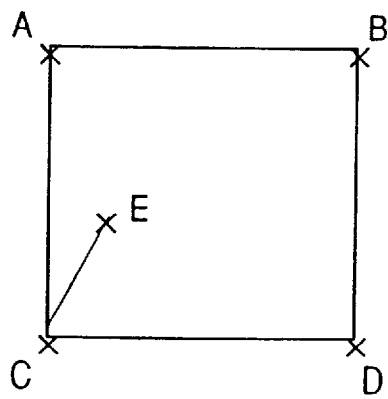
FIG. 1 is a schematic view showing a closest interpolating method.
Figure 2:
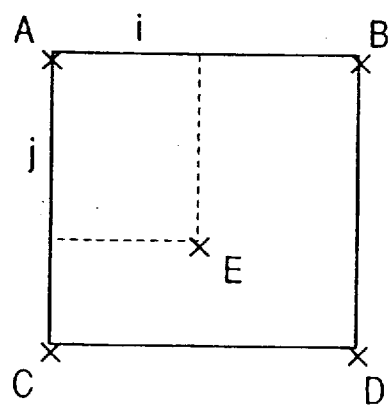
FIG. 2 is a schematic view showing a common primary interpolating method.
Figure 3:
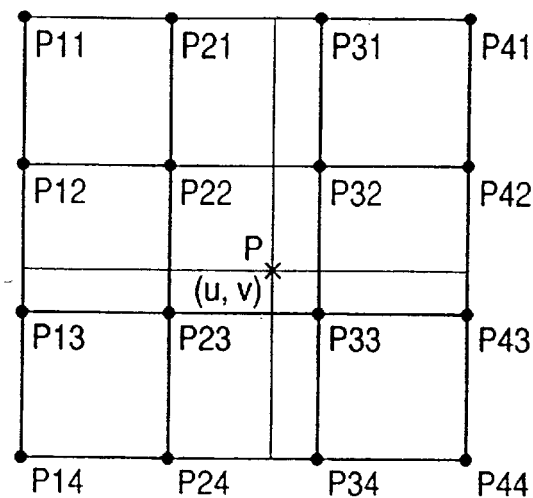
FIG. 3 is a schematic view showing a cubic convolution interpolating method.

In the example shown in FIG. 11 three-times interpolation is realized in a vertical direction, and the interpolating operation in a horizontal direction, or another vertical direction is executed by the interpolation unit 107. In this case, the conventional methods shown in FIGS. 1 to 3, and the like are regarded as the interpolating method.

Additionally, in the interpolating method according to the embodiment, the pixel information is not necessarily arranged in a desired interpolation position among the pixels. In this case, when the interpolating operation is applied using the pixels extracted and arranged from the other frames and the pixels of the present frame, desired interpolation position information is calculated. When a plurality of still images are synthesized, as compared with one frame of still image, the pixel referred to in the interpolating operation is closer to the interpolation position, so that a higher-precision image can be prepared.

Additionally, the case where the high resolution is realized by interpolating the pixels has been described in the embodiment, but it goes without saying that the present invention can similarly be applied even when enlargement magnification change is realized.

As described above, according to the embodiment, by extracting the motion vectors for a plurality of frames, and dividing the vectors by the number of frames, the resolution of the motion vector amount of the continuous frames can be set to be finer than one pixel unit. Therefore, by synthesizing the plurality of frames with the resolution finer than one pixel, the high-resolution image can be generated more exactly.

Moreover, as compared with when the motion vectors of the continuous frame are calculated, the frequency of operations of the motion vectors is reduced, so that a high-speed processing can be realized.

Therefore, since one frame of high-resolution still image information can easily be prepared, for example, from the low-resolution still image information photographed by the video camera, and outputted via the printer, and the like, the output of high-quality images can be realized in the image processing system to perform communication between the apparatuses different in input/output resolution.

A second embodiment of the present invention will be described hereinafter.

Figure 12:
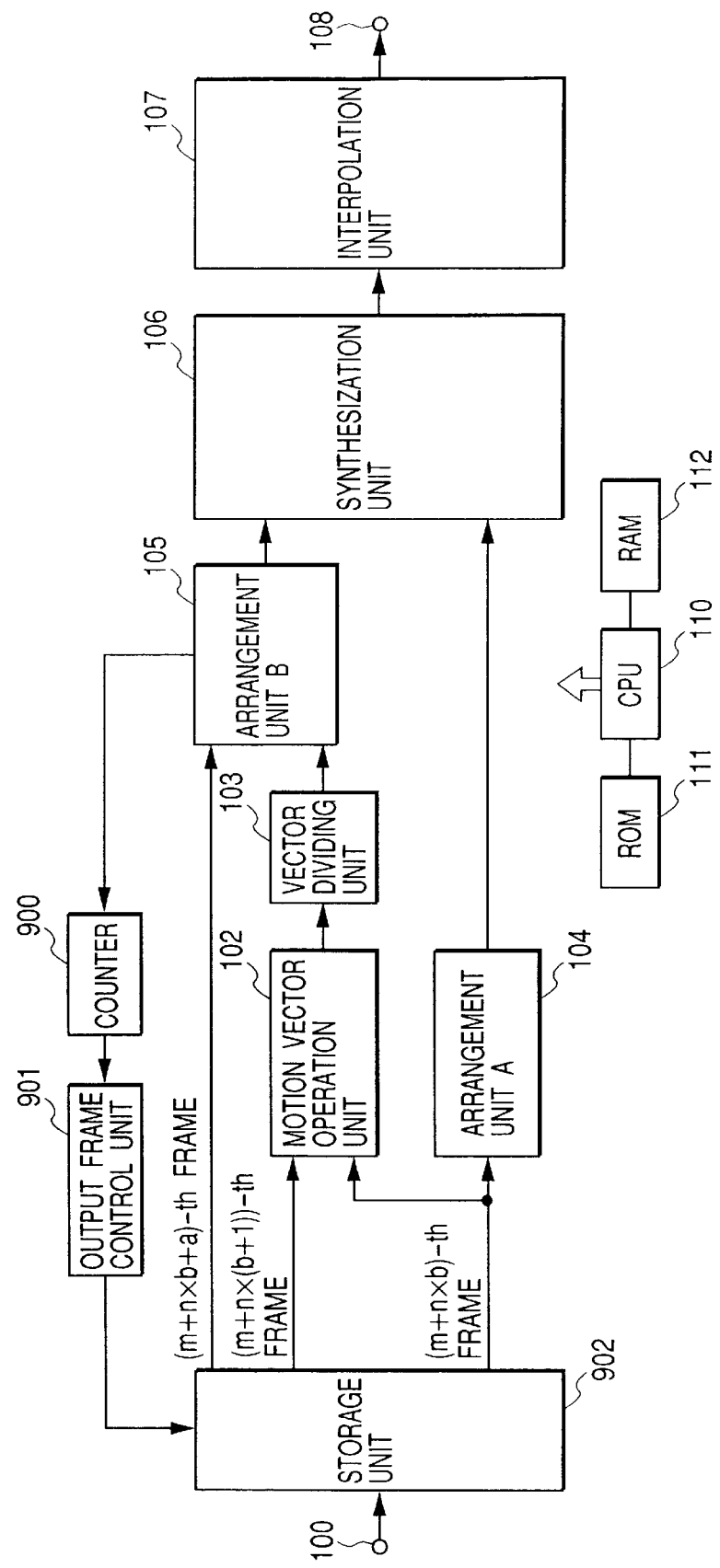
FIG. 12 is a block diagram showing the image processing apparatus according to a second embodiment of the present invention.

FIG. 12 is a block diagram showing the functional constitution of the computer as the image processing apparatus of the second embodiment, the same constitution as that of FIG. 4 in the first embodiment is denoted by the same reference numerals, and the description thereof is omitted.

This second embodiment is characterized in that when one frame of still image is prepared, two types of images as the calculation object of the motion vector are successively switched, and further synthesized.

In FIG. 12, a counter 900 counts the frequency of arrangement based on each divided vector in the arrangement unit B 105.

An example in which the motion vector between the m-th frame and the (m+n)-th frame is calculated in the same manner as the first embodiment, and (n−1) frames from the (m+1)-th frame to the (m+n−1)-th frame are arranged based on the divided vector will now be described.

In the counter 900, when the arrangements of the (n−1) frames are counted, notification is transmitted to an output frame control unit 901. The output frame control unit 901 receives the notification, and designates two frames as the next motion vector calculation objects from the frames stored in a storage unit 902. For the next two frames, one of the previous two frames, that is, the (m+n)-th frame serves as a reference, and the motion vector between the reference and the (m+2n)-th frame advanced from the reference by n frames is calculated.

Subsequently, the pixel arrangement based on the motion vector is performed in the arrangement unit A 104 and the arrangement unit B 105, and synthesized in the synthesizing unit 106. In this case, in the synthesizing unit 106, a synthesized image is completed based on the previous m-th frame to the (m+n−1)-th frame. Therefore, the pixel arrangement based on the (m+n)-th frame to (m+2n−1)-th frame is further synthesized on the synthesized image.

As described above, in the second embodiment, the images advanced by n frames are serially compared to obtain the motion amount, and the pixels are serially arranged based on the divided vector obtained by dividing the motion amount by n. Specifically, as shown in FIG. 12, assuming that b indicates an integer, the motion vector is obtained by (m+n×b)-th frame and (m+n×(b+1))-th frame, and (m+n×b+a)-th frame is arranged for every (n−1) frames based on the divided vector. Subsequently, this processing is repeated to a predetermined upper limit value by incrementing b each by one, a higher quality and resolution image can be obtained.

As described above, according to the second embodiment, in addition to the effect obtained from the first embodiment, the number of frames for use in preparing one still image is increased by setting the upper limit value of b to be large, the image quality after the interpolation is further enhanced.

Additionally, in the second embodiment, there can be provided the image processing apparatus in which the resolution conversion by best image quality can be realized by setting the values of n, b, for example, to experimentally obtained optimum values.

Furthermore, it has been described in the second embodiment that the counter 900 counts the arrangement frequency in the arrangement unit B 105, but the numeric value to be counted is not limited to the arrangement frequency, and can be any value as long as it can define the start timing of the next motion vector operation.

A third embodiment of the present invention will be described hereinafter.

Figure 13:
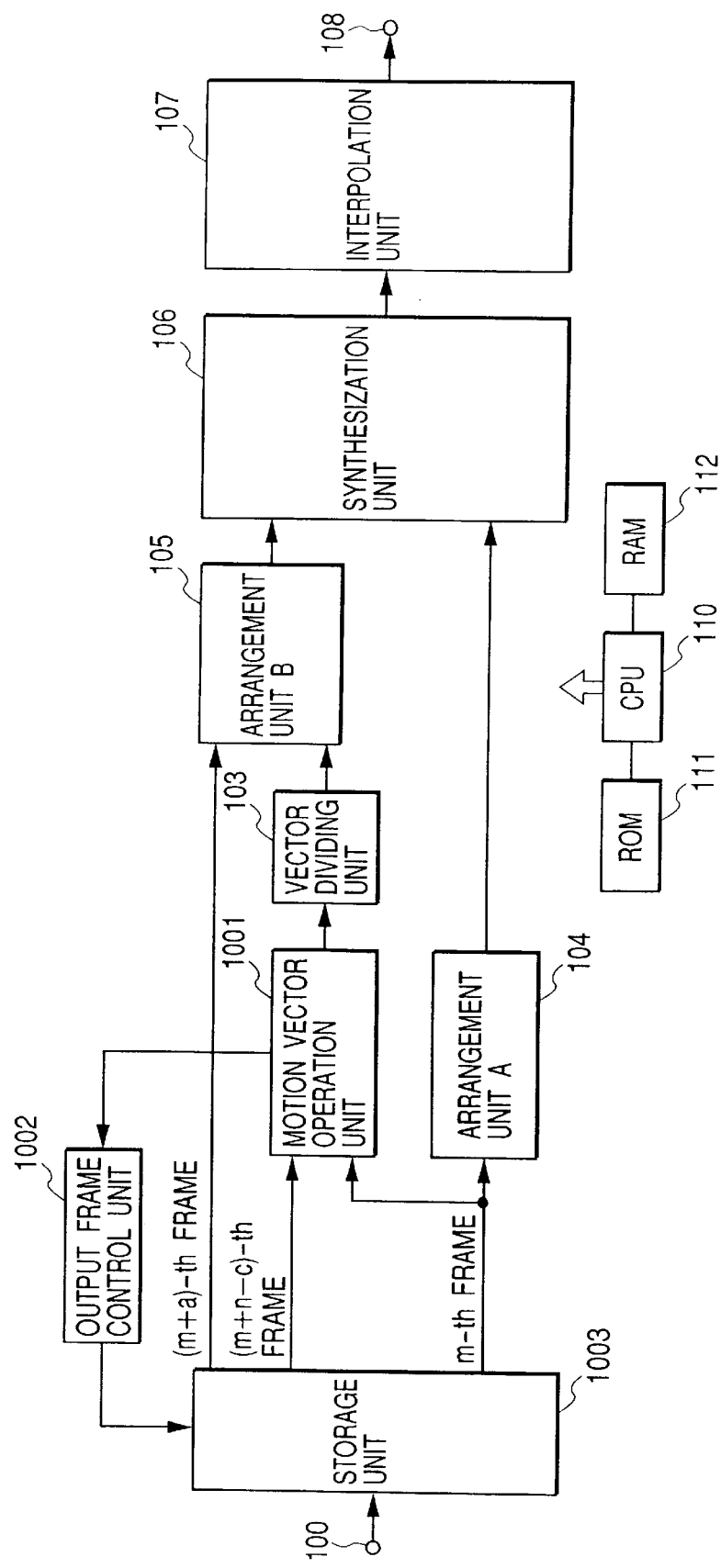
FIG. 13 is a block diagram showing the image processing apparatus according to a third embodiment of the present invention.

FIG. 13 is a block diagram showing the functional constitution of the computer as the image processing apparatus of the third embodiment, the same constitution as that of FIG. 4 in the first embodiment is denoted by the same reference numerals, and the description thereof is omitted.

The third embodiment is characterized in that two types of images as the motion vector calculation objects are switched in accordance with the size of the calculated motion vector amount. Specifically, in the constitution, the comparison object frame is fed back based on the vector amount calculated in a motion vector operation-unit 1001.

Here, the calculation of the motion vector between the m-th frame and the (m+n)-th frame in the motion vector operation unit 1001 in the same manner as in the first embodiment is considered. In this case, from the m-th frame over to the (m+n)-th frame, when it is judged that the movement amount is larger than a preset threshold value, that is, that the calculated value of the motion vector is large, this is notified to an output frame control unit 1002. In the output frame control unit 1002, the (m+n−1)-th frame reversed from the (m+n)-th frame by one frame is designated as the vector operation object in a storage unit 1003. Then, the storage unit 1003 outputs the (m+n−1)-th frame, and the motion vector operation unit 1001 in turn compares the m-th frame and the (m+n−1)-th frame.

Specifically, the frame to be compared with the m-th frame in the motion vector operation unit 1001 is the (m+n−c)-th frame (c=0 to n−2) according to the situation. While increasing the value of c by one, two frames are compared. Even in c=n−2, when the motion vector is still larger than the predetermined threshold value, synthesis is not performed, and the m-th frame image is outputted as it is.

In the arrangement unit B 105, the (m+a)-th frame (a=1 to (n−c−1)) is inputted for (n−c−1) frames, and the pixel values are arranged in accordance with the vector divided amount divided by (n−c).

As described above, according to the third embodiment, in addition to the effect obtained from the first embodiment, by calculating the motion vector only between the frames having an appropriate movement amount to perform an appropriate interpolation processing, the image quality after the interpolation is further enhanced.

Additionally, in the first to third embodiments, the processing of calculating the motion vector amount for the frame advanced from the m-th frame in point of time has been described, but the motion vector can also be calculated utilizing the frames before the m-th frame.

Moreover, in the first to third embodiments, the template matching has been explained as the example of the motion vector calculating method, but other methods may be used. For example, when the movement between the frames is other than the parallel movement, there is considered a method which comprises calculating the movement of a rotation system as an affine transformation coefficient, dividing the coefficient, and arranging the pixels.

A fourth embodiment will be described hereinafter with reference to the block diagram of FIG. 14. Additionally, in FIG. 14 the same constituting elements as those of FIG. 4 are denoted with the same reference numerals, but in the fourth embodiment, the motion vector among a plurality of frames continuous in point of time is derived with a resolution less than the pixel pitch in the following technique.

Figure 14:
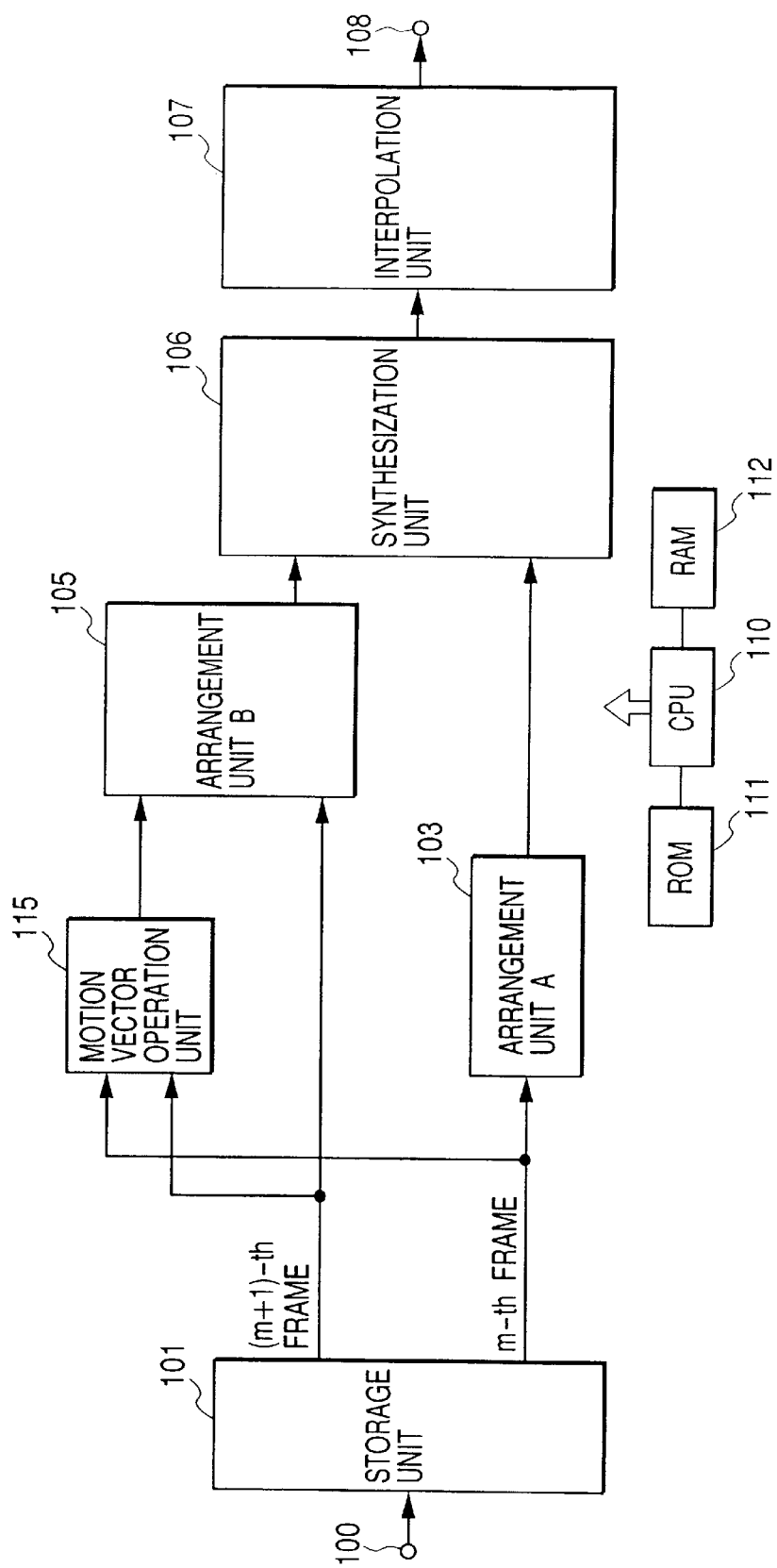
FIG. 14 is a block diagram showing the image processing apparatus according to a fourth embodiment of the present invention.

In FIG. 14, numeral 115 denotes a motion vector operation unit of the fourth embodiment, which measures the movement amount of partial movement as the motion vector based on the difference of continuous two frames.

Figure 15:
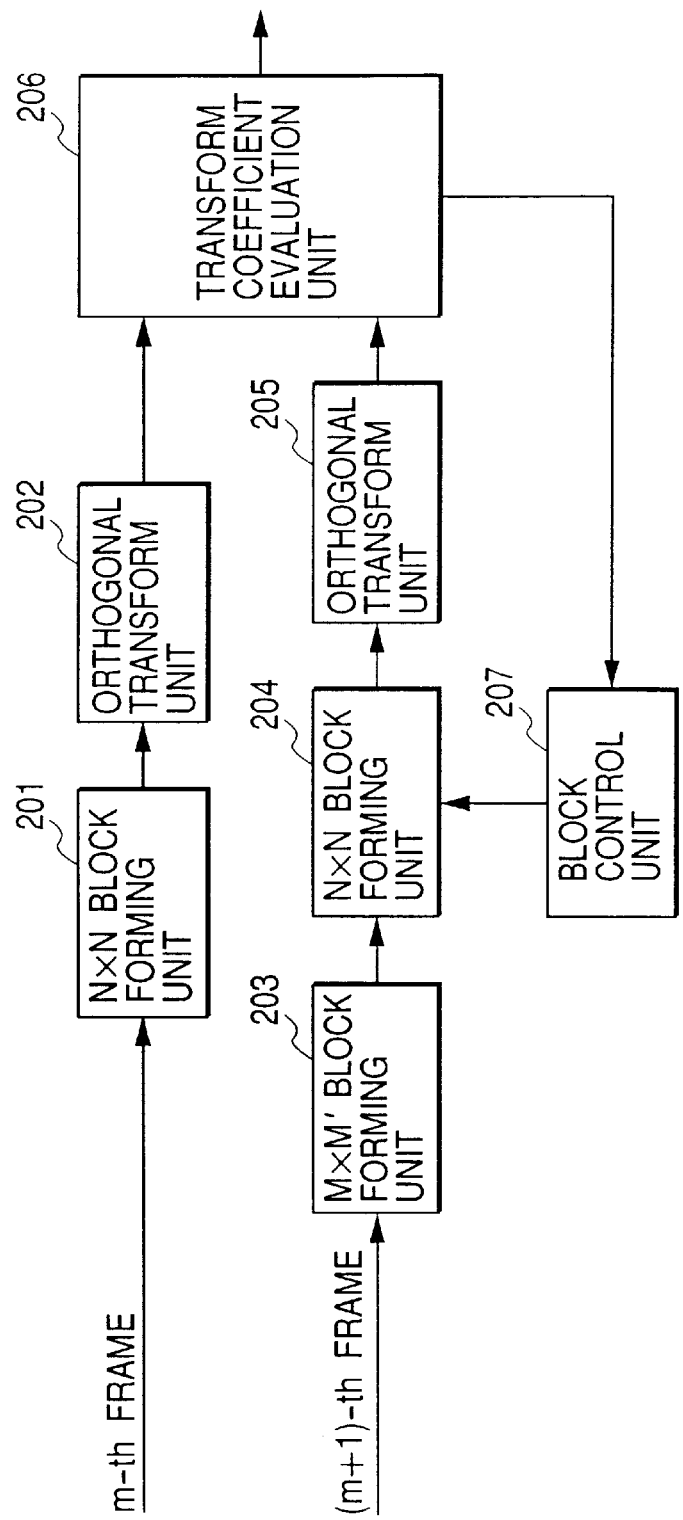
FIG. 15 is a block diagram showing the detail of a motion vector operation unit in FIG. 14.

The detailed block diagram of the motion vector operation unit 115 of the fourth embodiment is shown in FIG. 15. For the two types of images transmitted to the motion vector operation unit 115 from the storage unit 101 of FIG. 14, it is assumed that one type is an image immediately after the user issues a pickup command (time m-th frame), and the other type is an image of one frame after the time m-th frame ((m+1)-th frame).

In FIG. 15, numeral 201 denotes a block forming unit for forming a block of m-th frame image in the unit of N×N pixels. Various values are considered for N, but N=8 is postulated as an example. The noted block of 8×8 pixels prepared in this manner is tentatively referred to as block A. Subsequently, the orthogonal transform of the block A is operated in an orthogonal transform unit 202. The type of the orthogonal transform is not limited, but Hadamard transform which can easily be operated at a high speed, discrete cosine transform (DCT) employed in Joint Photographic Expert Group (JPEG), and the like are general.

Now, in the example of DCT, the transform coefficient of two-dimensional DCT of N×N pixels is obtained in the following equation (6).

$$F(U, v) = (2/N)C(u)C(v) \qquad (6)$$

$$\sum_{m=0}^{N-1}\sum_{n=0}^{N-1} f(m, n)\cos((2m + 1)ux/2N)\cos((2n + 1)vx/2N$$

$$C(p)=1/\sqrt{2}(p=0)$$

$$C(p)=1 \ (p \neq 0) \qquad (6)$$

On the other hand, the image of the (m+1)-th frame is formed into a block in the unit of M×M' pixels by a block forming unit 203. In this case, the block formed in the unit of M×M' pixels includes the block of N×N pixels of the same coordinate as that of the block A in the image of the (m+1)-th frame. Here, for the size relation of M and N, M≧N, and M'≧N (except the case of M=M'=N). It is now assumed that M=M'=20. Specifically, 20×20 blocks including the block of N×N pixels of the same coordinate as that of the block A are prepared in the (m+1)-th frame.

Subsequently, the block of N×N pixels having the same size as that of the m-th frame is prepared in the block of 20×20 pixels by a block forming unit 204. The preparation of the block may start from the same coordinate as that of the block A, or may start in order from the end of the M×M' block. Now, the block of N×N pixels prepared in the image of the (m+1)-th frame is tentatively referred to as a block B.

Numeral 205 denotes an orthogonal transform unit to orthogonally transform the prepared block B in the same manner as the block A. The orthogonal transform units 202, 205 have to perform the orthogonal transform with the same transform means. A transform coefficient evaluation unit 206 evaluates the similarity of the transform coefficient based on the orthogonal transform coefficients of the blocks A and B. Based on the direct current (DC) component of the block, and mainly the low-frequency component of alternating current (AC) component, the similarity is evaluated by the sum of the value obtained by multiplying the difference of the coefficients by a weighting coefficient for each component.

Figure 16:
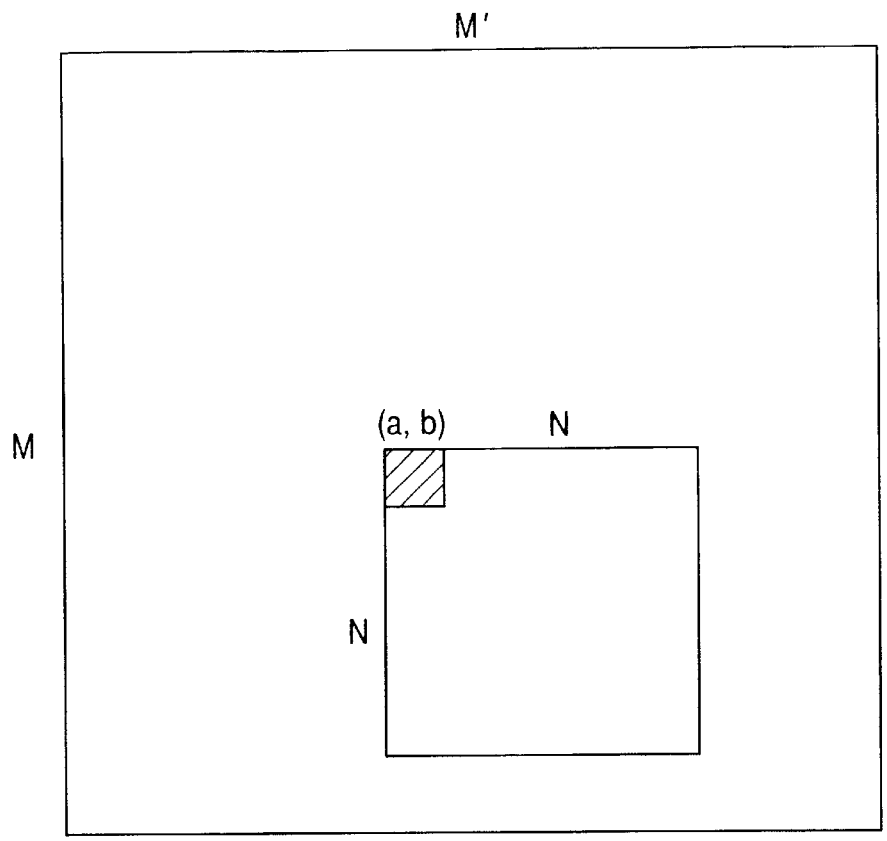
FIG. 16 is a schematic view showing the operation of the motion vector operation unit in FIG. 14.

Now, to facilitate the description, it is assumed that the block coordinate is managed by the coordinate of the left upper pixel forming the block (the pixel coordinate is hereinafter referred to as the block management coordinate). Specifically, as shown in FIG. 16, assuming that the management coordinate of the block B is (a, b), the evaluation function of the similarity of the blocks A and B is calculated as follows:

$$R(a, b) = \sum_{u=0}^{N-1} \sum_{v=0}^{N-1} (W(u, v) \times |FA(u, v) - FB(a, b)(u, v)|) \quad (7)$$

In the equation, W(u,v) denotes the weighting coefficient of component (u,v), FA(u,v) denotes the orthogonal transform coefficient of the block A, and FB(a,b)(u,v) denotes the orthogonal transform coefficient of the block B when the management coordinate is (a, b).

Since the correlation of the transform coefficients of adjacent blocks is lowered in a higher frequency area, the value of the weighting coefficient W(u,v) is set to be small in the high frequency area. Since the transform coefficients of the low frequency area of the blocks whose coordinates are spatially close to each other is very highly correlated, in the equation (7), evaluation is performed by replacing the spatial position relation of the blocks with the similarity of the transform coefficients. Moreover, the absolute value is used in the equation (7), but the similar evaluation can be realized even with the square of the difference.

A block control unit 207 moves the management coordinate (a, b) of the block B by one pixel to prepare a new block, and repeats similar processings to perform control. Specifically, in the example of N=8, M=M'=20, since 13×13 blocks of 8×8 pixels can be prepared in the block of 20×20 pixels, the similarity is repeatedly calculated for the blocks.

When the scanning of the block B is completed in the image of the (m+1)-th frame, the coordinate (a', b') in which the evaluation function R(a, b) is minimized is determined. Specifically, since the similarity R(a, b) can be regarded as the error component between the blocks A and B, the block B when R(a, b) takes the minimum value (this block is referred to as a block B') is regarded as the block also spatially closest to the block A, and judged in a position to which the block A moves. However, in this case, since the resolution of the motion vector corresponds to the unit of one pixel in the same manner as in the conventional example, the motion vector cannot be detected with a resolution which is less than the between-pixel distance.

Therefore, in the embodiment, the motion vector is detected/presumed with the resolution which is shorter than the between-pixel distance. The method of detecting the vector will be described hereinafter.

In the above-described method, it is assumed that the management coordinate of the block A as the noted block of the m-th frame is (a0, b0), and the management coordinate of the block B' of the (m+1)-th frame which takes the minimum value of R(a, b) is (a', b'). In the transform coefficient evaluation unit 206, the block B' is roughly retrieved in the unit of pixel, but this time a fine distance is detected only in the periphery of the block B'. Specifically, the transform coefficient evaluation unit 206 carries out two stages of evaluations different in constitution: first the retrieval of the block B' which seems to be spatially closest; then the detection of a minute deviation amount from the obtained block B'.

Figure 17:
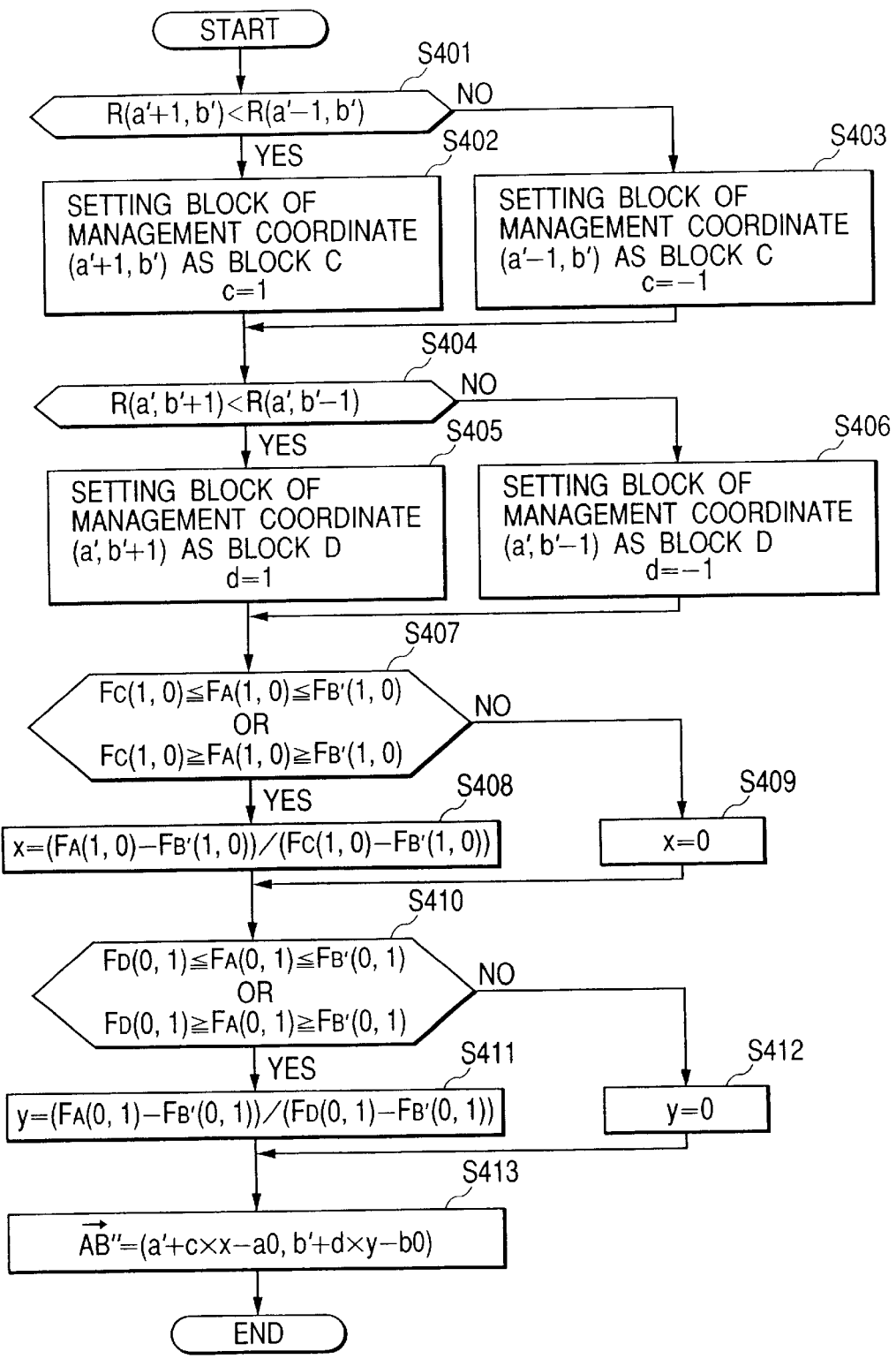
FIG. 17 is a flowchart showing a part of a processing in the motion vector operation unit in FIG. 14.

FIG. 17 is a flowchart showing the operation procedure of the second-stage detection.

In S401, the evaluation function results of the block prepared one pixel to the left of the block B and the block prepared one pixel to the right by the equation (7) are compared. Specifically, since the management coordinate of the block B' is (a', b'), the sizes of R(a'+1, b') and R(a'−1, b') are evaluated. Since the R(a'+1, b'), R(a'−1, b') are calculated in the first-stage similarity evaluation, the operation results are preferably stored/held.

Subsequently, if R(a'+1, b') is evaluated as being small even in S401, the procedure shifts to S402. Moreover, if it is evaluated as being not small, the procedure shifts to S403. In S402 the block of management coordinate (a'+1, b') is set as a block C, and in S403 the block of management coordinate (a'−1, b') is set as the block C. Additionally, in S402 a variable c is set to c=1, and in S403 it is set to c=−1.

Subsequently, in S404, the evaluation function results of the block prepared above the block B' by one pixel and the block prepared below by one pixel by the equation (7) are compared. Specifically, since the management coordinate of the block B' is (a', b'), the sizes of R(a', b'+1) and R(a', b'−1) are evaluated. Since the similarity evaluation functions are also calculated in the first-stage similarity evaluation, the operation results are preferably stored/held.

In S404, if R(a', b'+1) is evaluated as being small, the procedure shifts to S405, and if it is evaluated as being not small, the procedure shifts to S406. In S405 the block of management coordinate (a', b'+1) is set as a block D, and in S406 the block of management coordinate (a', b'−1) is set as the block D. Additionally, in S405 a variable d is set to d=1, and in S406 it is set to d=−1.

Subsequently in S407, the size relation of three types of values of a transverse AC basic wave component $F_A(1, 0)$ in the orthogonal transform coefficient of the block A and transverse AC basic wave components $F_B'(1, 0)$, $F_C(1, 0)$ in the orthogonal transform coefficients of the block B' and the block C is evaluated. Specifically, it is judged whether or not the value of $F_A(1, 0)$ exists between the values of $F_B'(1, 0)$ and $F_C(1, 0)$. If the value exists, the procedure goes to S408, and if not, the procedure goes to S409. In S408, a variable x is calculated in the following equation.

$$x = \{F_A(1,0) - F_B'(1,0)\} / \{F_C(1,0) - F_B'(1,0)\} \quad (8)$$

Moreover, in S409, the variable x is set to x=0.

Similarly, in S410, the size relation of three types of values of a vertical AC basic wave component $F_A(0, 1)$ in the orthogonal transform coefficient of the block A and transverse AC basic wave components $F_B'(0, 1)$, $F_D(0, 1)$ in the orthogonal transform coefficients of the block B' and the block D is evaluated. Specifically, it is judged whether or not the value of $F_A(0, 1)$ exists between the values of $F_B'(0, 1)$ and $F_D(0, 1)$. If the value exists, the procedure goes to S411, and if not, the procedure goes to S412. In S411, a variable y is calculated in the following equation.

$$y = \{F_A(0,1) - F_B'(0,1)\} / \{F_D(0,1) - F_B'(0,1)\} \quad (9)$$

Moreover, in S412, the variable y is set to y=0.

In S413, the motion vector to the block (referred to as the block B") which is judged to be really moved from the block A is set based on the calculated x, y by the equations (8), (9) as follows, thereby ending the procedure.

$$\overline{AB}'' \text{ (the motion vector)}=(a'+cXx-a0, b'+dXy-b0) \quad (10)$$

Specifically, the motion vector to the block B' from the block A is as follows:

$$\overline{AB}'=(a'-a0, b'-b0) \quad (11)$$

Therefore, terms c×x, d×y of the equation (10) are vector components whose resolutions are higher than the between-pixel distance.

The processing of the above flowchart will be described in more detail with reference to FIGS. 18 to 23.

Figure 18:
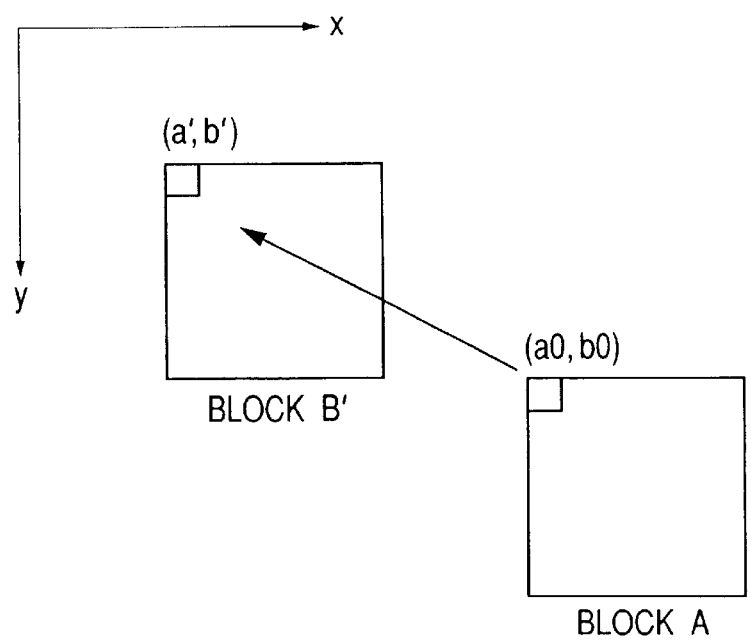

FIG. 18 is a diagram showing the correlation of the blocks A and B'. As described above, the management coordinate of the block A is (a0, b0), and the management coordinate of the block B' is (a', b'). Now, the vector to the block B' from the block A is roughly calculated by the first-stage similarity evaluation.

Figure 19B:
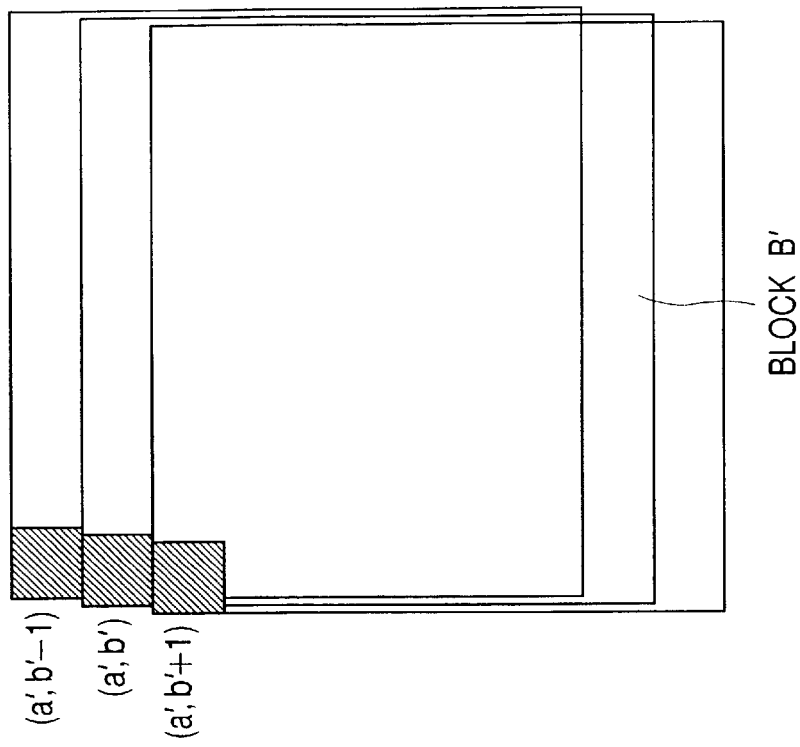
Figure 19A:
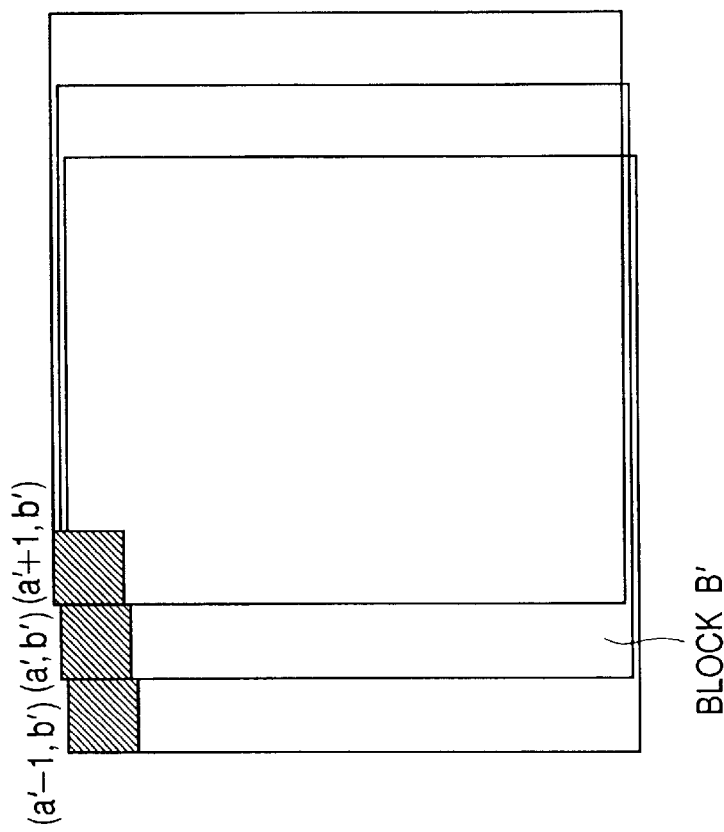

FIGS. 19A, 19B are diagrams showing the correlation of the block B' and the blocks prepared in the periphery of the block B'. FIG. 19A shows the peripheral blocks in a transverse direction, that is, two types of blocks formed by shifting management coordinate by one pixel each to the left and the right centering on the block B' whose management coordinate is (a', b'). In FIG. 19A, the blocks slightly deviate in a vertical direction, but this represents the correlation of the blocks to facilitate the understanding, and the blocks do not actually deviate in the vertical direction. In FIGS. 19A, 19B, the pixels shown by slanting lines indicate the pixels of the management coordinates. As described above, either one of these blocks is set as the block C.

Similarly, FIG. 19B shows the peripheral blocks in the vertical direction, that is, two types of blocks formed by vertically shifting the management coordinate by each pixel centering on the block B' whose management coordinate is (a', b'). In FIG. 19B, the blocks slightly deviate in the transverse direction, but this represents the correlation of the blocks to facilitate the understanding, and the blocks do not actually deviate in the transverse direction. Similarly, either one of these blocks is set as the block D. As described above, the setting of the block C or D is performed by judging whether the block has a high similarity in orthogonal transform coefficient to the block A.

Figures 22, 23:
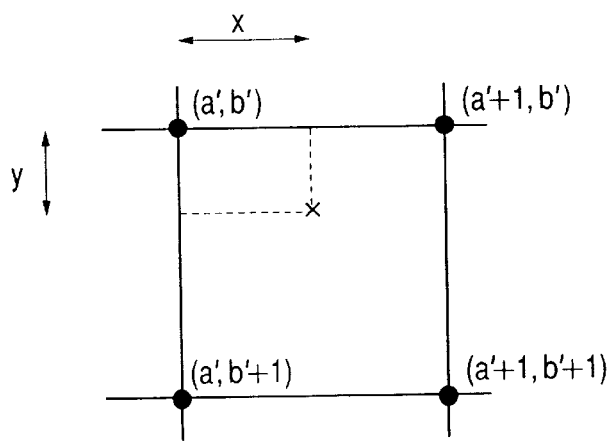

FIGS. 20, 21, 22 show the pixel values of the blocks A, B', C in the actual natural image, and DCT transform coefficients calculated by the equation (6).

In FIG. 20 numeral 701 denotes the image data of the block A as the noted block in the m-th frame. The block size is now set to 8×8 pixels. Numeral 702 denotes DCT transform coefficients of the block A. The block B' in the (m+1)-th frame is retrieved based on the transform coefficients 702.

In FIG. 21 numeral 711 denotes the pixel values of the block B' which is evaluated to have a highest similarity as a result of retrieval. Numeral 712 denotes DCT transform coefficients of the block B' for use in the retrieval. As apparent from 702, 712, the similarity is found to be high.

In FIG. 22, numeral 721 denotes the block C with the management coordinate of the block B' moved to the right by one pixel. This is evaluated as being higher in similarity than the block whose management coordinate has moved to the left by one pixel, and selected. Numeral 722 indicates the DCT transform coefficients of the block C. The similarity between the block C (722) and the block A (702) is naturally lower than the similarity between the block B' (712) and the block A (702) (error is large).

Here, to synthesize the block A in the space between the pixels of the block B' and the block C deviating by one pixel, the arrangement position has to be determined within the between-pixel distance. Then, as described in the flow of FIG. 17, the transverse AC basic wave components of the DCT transform coefficients 702, 712, 722 are noted. Now, since the transverse AC basic wave components are "36.37" in 702, "35.50" in 712, and "41.46" in 722, the position is estimated by mutually comparing the components. Specifically, it is presumed that the basic wave component linearly shifts in proportion to the spatial distance.

Here, by applying actual values to the equation (8), the transverse distance from the block B' is calculated as follows:

$$x=(36.37-35.50)/(41.46-35.50)\approx 0.15$$

Specifically, it is judged that the management coordinate of the block B'' is positioned at the right of the management coordinate of the block B' by 0.15 pixel.

As described in the flow of FIG. 17, when the transverse basic wave components of the blocks B', A, C do not monotonously increase or decrease, it is judged that the coordinate is in the same position as that of the coordinate of the block B' in the transverse direction.

Similarly, for the vertical direction, the vertical distance y from the block B' is calculated assuming that the arrangement is linear to the change ratio of the vertical basic wave component.

FIG. 23 shows an example of positional relation of x, y from the management coordinate of the block B', and x, y are both within the distance of one pixel. In the example of FIG. 23, the block is positioned at the right of and below the block B'. Black circle marks indicate the pixel positions of the (m+1)-th frame. When the values of x, y are calculated by the above-described flow, the position of a cross mark moved from the position of (a', b') by x in the transverse direction and by y in the vertical direction corresponds to the position of the management coordinate in which the block A is synthesized.

The motion vector to the block B'' as the real movement position from the block A is as shown in the equation (10).

The detection of the motion vector having the resolution within the between-pixel distance has been described above, and by repeating the detection of the above-described motion vector for each of the continuous frames, the number of frames to be synthesized is increased, so that a higher resolution still image can be prepared. In this case, when no synthesis information is positioned in a desired interpolation point, the pixel values of the blocks A and B' can be used to interpolate and obtain the pixel value of the interpolation point. This interpolation may be performed using the methods shown in FIGS. 1 to 3.

Moreover, in the fourth embodiment, the setting of the blocks C and D is performed by the similarity evaluation, but this is not limited, and the setting of the blocks C and D may be performed singly by comparing the transform coefficients.

Figure 24:
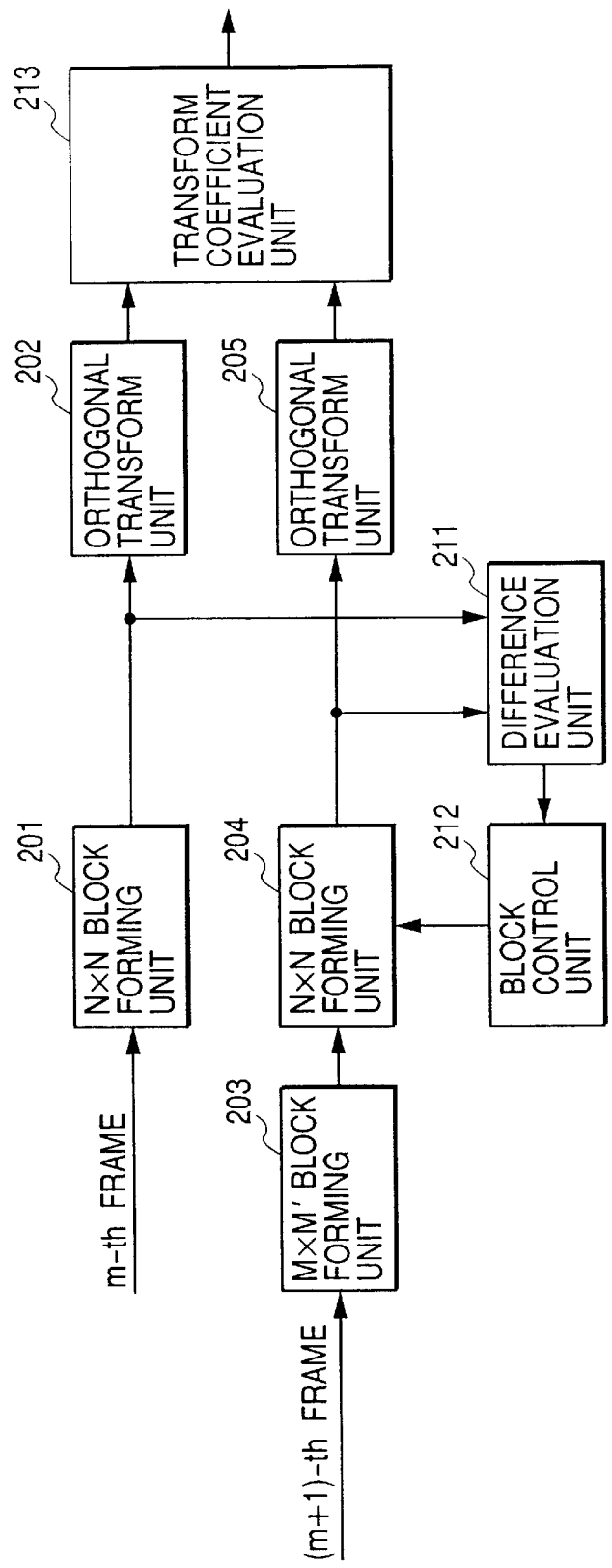
FIG. 24 is a block diagram showing the image processing apparatus according to a fifth embodiment of the present invention.

FIG. 24 is a block diagram showing a fifth embodiment of the present invention. In the embodiment, the content of the motion vector operation unit 102 of FIG. 14 is different from that of FIG. 15, but the entire block configuration is the same as that of FIG. 14.

In FIG. 24, the same sections as those of FIG. 15 are denoted with the same reference numerals for description.

In the same manner as in FIG. 15, the block forming unit 201 forms the image information of the m-th frame into a block in the unit of N×N pixels. The block forming unit 203 forms the image information of the (m+1)-th frame into a block in the unit of M×M' pixels, and the block forming unit 204 forms a block of the N×N pixel unit within the block of the M×M'pixel unit. In this case, the relation of N, M, M' is the same as that in FIG. 15.

In FIG. 15, the block similarity is evaluated by comparing the orthogonal transform coefficients of the N×N pixel blocks of the m-th frame and the (m+1)-th frame. However, when the orthogonal transform coefficients are compared, an orthogonal transform processing is necessary in each block, which requires processing much time.

To solve the problem, the fifth embodiment is characterized in that the retrieval in real space and the comparison of the orthogonal transform coefficients are mixedly used. Specifically, the evaluation is performed by the operation of the pixel values in the real space until the block B' is determined, and a minute deviation amount within the between-pixel distance is estimated based on the orthogonal transform coefficients.

In FIG. 24, a difference evaluation unit 211 performs the following operation, assuming that the management coordinate of the block B is (a, b).

$$R(a, b) = \sum_{m=0}^{N-1} \sum_{n=0}^{N-1} |IB(a, b)(m, n) - IA(m, n)| \quad (12)$$

In the equation, $I_B(a,b)(m,n)$ denotes a pixel value in the block B, and $I_A(m,n)$ denotes a pixel value in the block A.

In the same manner as the block control unit 207 of FIG. 15, a block control unit 212 repeats a series of operations comprising scanning the inside of the M×M' pixel block in the unit of one pixel, preparing a new block and evaluating a difference. Subsequently, when the scanning is completed, the block B in which the value of R(a, b) is minimized is determined as the block B'.

The method of detecting the motion vector in the real space is similar to the template matching used in the first to third embodiments, and the detailed description thereof is omitted.

When the determination of the block B' is completed on the real space, the minute deviation amount around the block B' is in turn estimated. The orthogonal transform unit 202 is means for applying the orthogonal transform of the block A. Similarly, the orthogonal transform unit 205 is means for applying the orthogonal transform of the blocks which horizontally and vertically deviate by one pixel from the management coordinates of the blocks B' and B. In a transform coefficient evaluation unit 213, the motion vector within the between-pixel distance is calculated based on the transform coefficients of the blocks according to the flowchart of FIG. 17.

As described above, in the fifth embodiment, two stages of estimation of a necessary motion vector comprise a first stage of detection by the real space, and a second stage of detection by the orthogonal transform coefficient, so that the speed of the processing of the fourth embodiment can be increased.

For the operation of the motion vector using the above-described orthogonal transform, the preparation of the high-resolution still image from the low-resolution motion image has been described in the fourth and fifth embodiments, but this technique can naturally be used in the motion compensation.

Moreover, the example of calculation of the estimated between-pixel distance x, y only with the ratio of the basic wave components has been described, but this is not limited.

It is natural to judge the distance in a composite manner using other AC components, and DC components can also be used.

Furthermore, in the fourth and fifth embodiments, the continuous images of the m-th frame and the (m+1)-th frame have been described, but the motion vector can similarly be detected regardless of continuous or discontinuous images. Specifically, the motion vector between the m-th frame and the (m+n)-th frame (n≧1) can naturally be synthesized using the technique of the fourth or fifth embodiment.

As described above, in the fourth and fifth embodiments, by comparing the orthogonal transform coefficients between the object blocks of the frames, the resolution of the motion vector amount of the continuous frames can be set to be finer than one pixel unit. By synthesizing a plurality of frames with the resolution finer than one pixel, high-resolution information can be prepared.

Moreover, by combining the matching processing on the real space, the enhancement of processing speed is anticipated, and the processing can be executed at a high speed.

Figure 25:
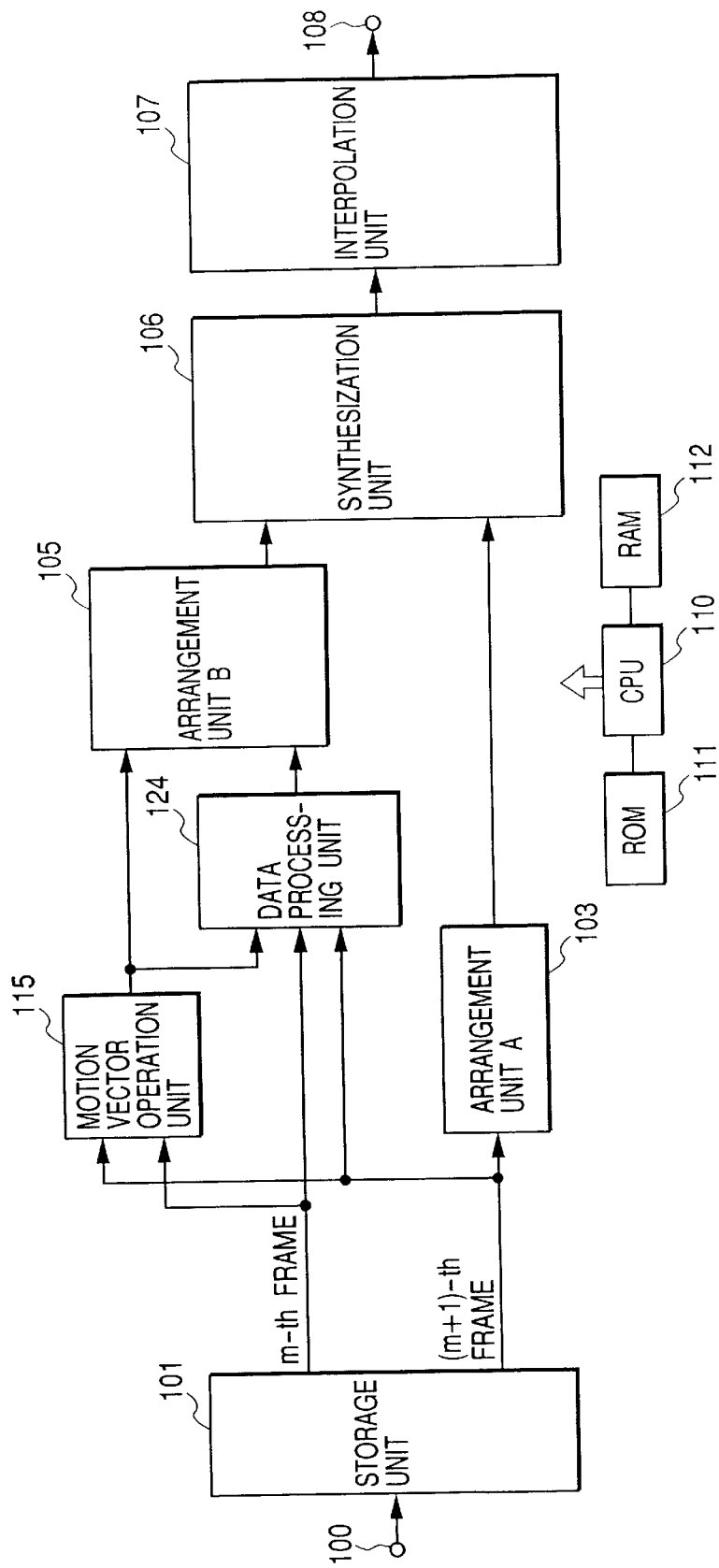
FIG. 25 is a block diagram showing the image processing apparatus according to a sixth embodiment of the present invention.

FIG. 25 is a block diagram showing the image processing apparatus according to a sixth embodiment, the constituting elements similar to those of the fourth embodiment shown in FIG. 14 are denoted by the same numerals, and the description thereof is omitted.

In the sixth embodiment, there is provided a data processing unit 124 which processes the pixel value to adapt the image information of the m-th frame well to the image information of the (m+1)-th frame. This data processing unit 124 forms a large characteristic of the sixth embodiment.

The operation of the data processing unit 124 using the motion vector which has a resolution less than the pixel pitch outputted by the motion vector operation unit 115 will be described hereinafter in detail.

Figure 26:
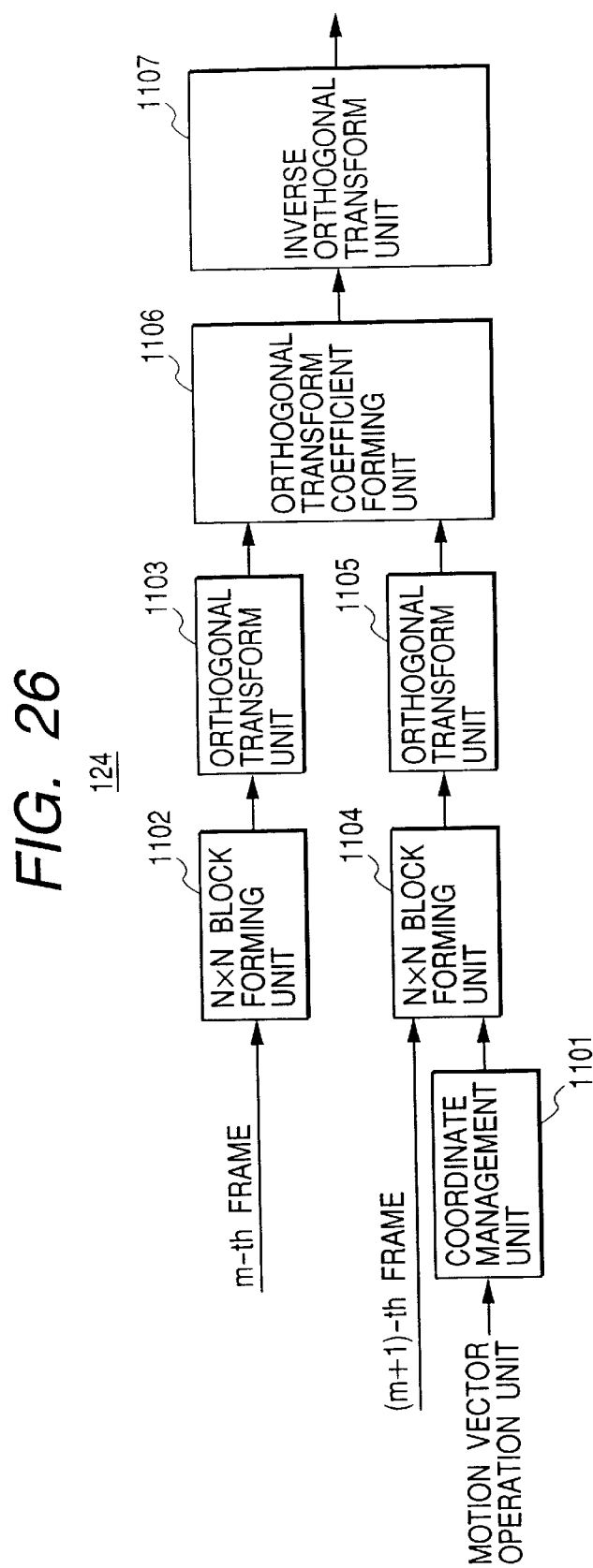
FIG. 26 is a block diagram showing the detailed constitution of a data processing unit in the apparatus of FIG. 25.

FIG. 26 is a block diagram showing the detailed constitution of the data processing unit 124.

In FIG. 26, a coordinate management unit 1101 manages the position of the (m+1)-th frame to which the block of the m-th frame is to move in accordance with the vector calculated by the motion vector operation unit 115. The coordinate management unit 1101 outputs the address in which the evaluation function of the equation (7) is the minimum. An N×N block forming unit 1102 forms the image of the m-th frame in the unit of N×N pixels. An orthogonal transform unit 1103 orthogonally transforms the blocked image information. When each unit holds the orthogonal transform information of the block (subject block) used in the previous-stage motion vector operation unit 115, the data processing unit 124 does not need to perform the processing.

Similarly, an N×N block forming unit 1104, and an orthogonal transform unit 1105 executes the forming of the block of the N×N pixel unit of the (m+1)-th frame, and the orthogonal transform processing based on the address received from the coordinate management unit 1101. When each unit holds the block having the minimum evaluation function, and the peripheral orthogonal transform information among the blocks (object blocks) prepared and evaluated in the previous-stage motion vector operation unit 115, the data processing unit 124 does not need to perform the processing.

Subsequently, an orthogonal transform coefficient forming unit 1106 forms a new transform coefficient from the orthogonal transform coefficients of the subject block of the m-th frame and a plurality of object blocks of the (m+1)-th frame. This orthogonal transform coefficient forming unit 1106 is one of the characteristics of the sixth embodiment.

An inverse orthogonal transform unit 1107 inversely transforms the newly prepared transform coefficient, and converts the coefficient to the pixel value of the real space.

The above is a series of flows of the data processing of the subject block.

Figure 27:
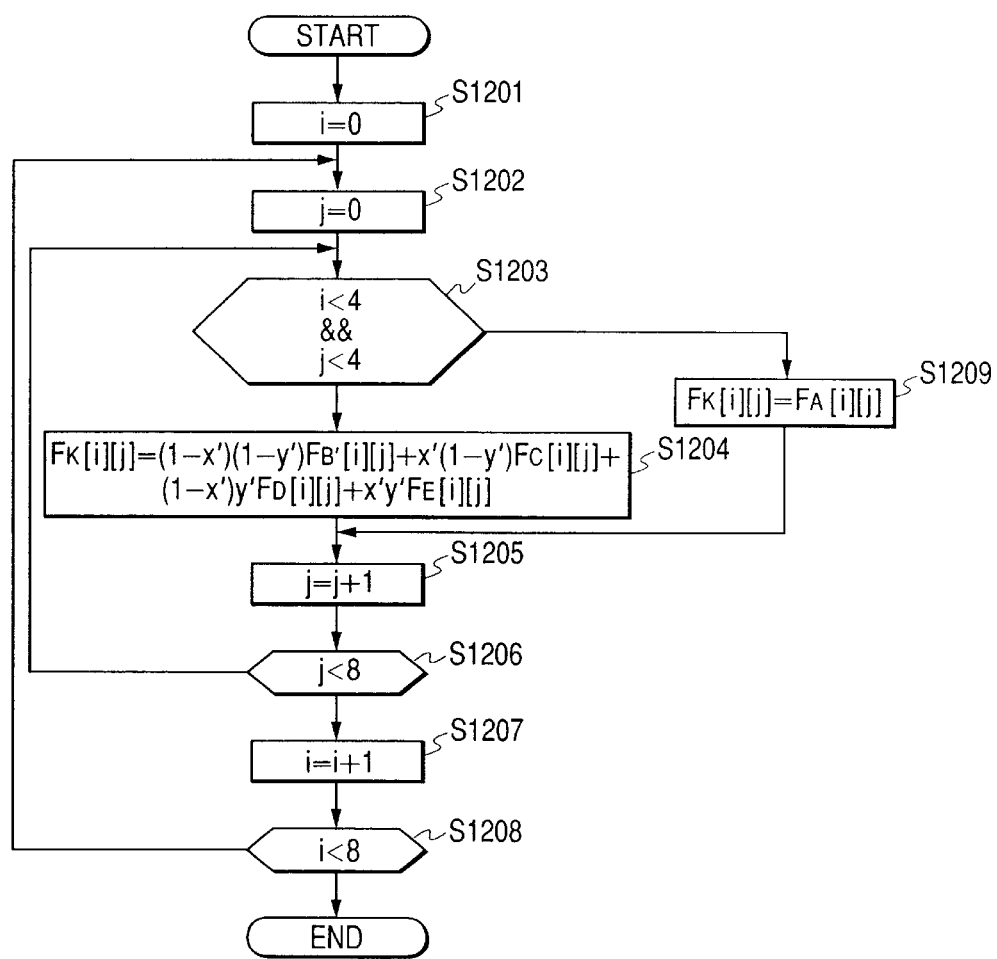
FIG. 27 is a flowchart showing an example of operation procedure of an orthogonal transform coefficient forming unit in the apparatus of FIG. 26.

FIG. 27 is a flowchart showing a first embodiment of operation procedure of the orthogonal transform coefficient forming unit 1106.

Now, the subject pixel block of the m-th frame is set to block A, the block having the minimum evaluation function of the (m+1)-th frame is set to block B', and the block whose evaluation function is evaluated as being small is set to block C out of two blocks formed by shifting by one pixel in the horizontal direction to the left or the right using the block B' as a reference. Similarly, the block whose evaluation function is evaluated as being small is set to block D out of two blocks formed by shifting by one pixel upward or downward in the vertical direction using the block B' as the reference. Moreover, the block which has x coordinate of origin of the block C, and y coordinate of origin of the block D as its origin is set to block E. The block E deviates from the block B' each by one pixel in both horizontal and vertical directions.

Moreover, the orthogonal transform coefficients of the blocks are set to $F_A$, $F_B'$, $F_C$, $F_D$, $F_E$, and the components of the transform coefficient are represented in the form of two-dimensional arrangement in order from vertical, then horizontal arrangement. For example, $F_A[3][5]$ indicates the orthogonal transform coefficient of a third component in the vertical (y-axis) direction of the block A and a fifth component in the horizontal (x-axis) direction, and is the same as $F_A(5, 3)$ represented in the coordinate form. Moreover, the orthogonal transform will be described in the example of DCT of 8×8 pixels.

In FIG. 27, S1201, S1202 indicate the initialization of variables, in which the variable i of vertical direction and the variable j of horizontal direction are initialized to "0". Subsequently, it is judged in S1203 whether or not the value of variable i or j is less than four. If YES, the following operation is performed in S1204.

$$F_K[i][j]=(1-x')\cdot(1-y')\cdot F_{B'}[i][j]+x'\cdot(1-y')\cdot F_C[i][j]+(1-x')\cdot y'\cdot F_D[i][j]+x'\cdot y'\cdot F_E[i][j] \quad (13)$$

In the equation, $F_K[i][j]$ indicates the orthogonal transform coefficient of newly prepared block K component [i][j]. Moreover, x', y'indicates the distance to the interpolation point from the origin of the block B'. Specifically, there are remarkably few cases in which the coordinate of x, y calculated by the equations (8), (9) completely agrees with the desired interpolation point. Actually, interpolation is performed on the closest interpolation point x', y'based on the calculated value of x, y. In other words, x', y'forms the origin of the block K.

The equation (13) represents linear interpolation in which the orthogonal transform coefficient values of the same components of four blocks $F_B'$, $F_C$, $F_D$, $F_E$ of the (m+1)-th frame are calculated by the distribution ratio for the coordinate x, y. Specifically, the transform coefficient is interpolated linearly to the distance in the real space even on the orthogonal transform axis.

Subsequently, the variable j is counted up in S1205, and it is judged in S1206 whether or not the block horizontal components are completed. If YES, the processing returns to S1203. If NO, the variable i is counted up in S1207. It is judged in S1208 whether or not the block vertical components are completed. If YES, the processing returns to S1202. If NO, it is judged that all 64 components are processed, thereby ending the processing.

On the other hand, if NO in S1203, it is determined that the high frequency area is processed, and the following operation is therefore executed in S1209.

$$F_K[i][j]=F_A[i][j] \quad (14)$$

Specifically, the orthogonal transform coefficient of the m-th frame is substituted in the high frequency area.

Figure 28:
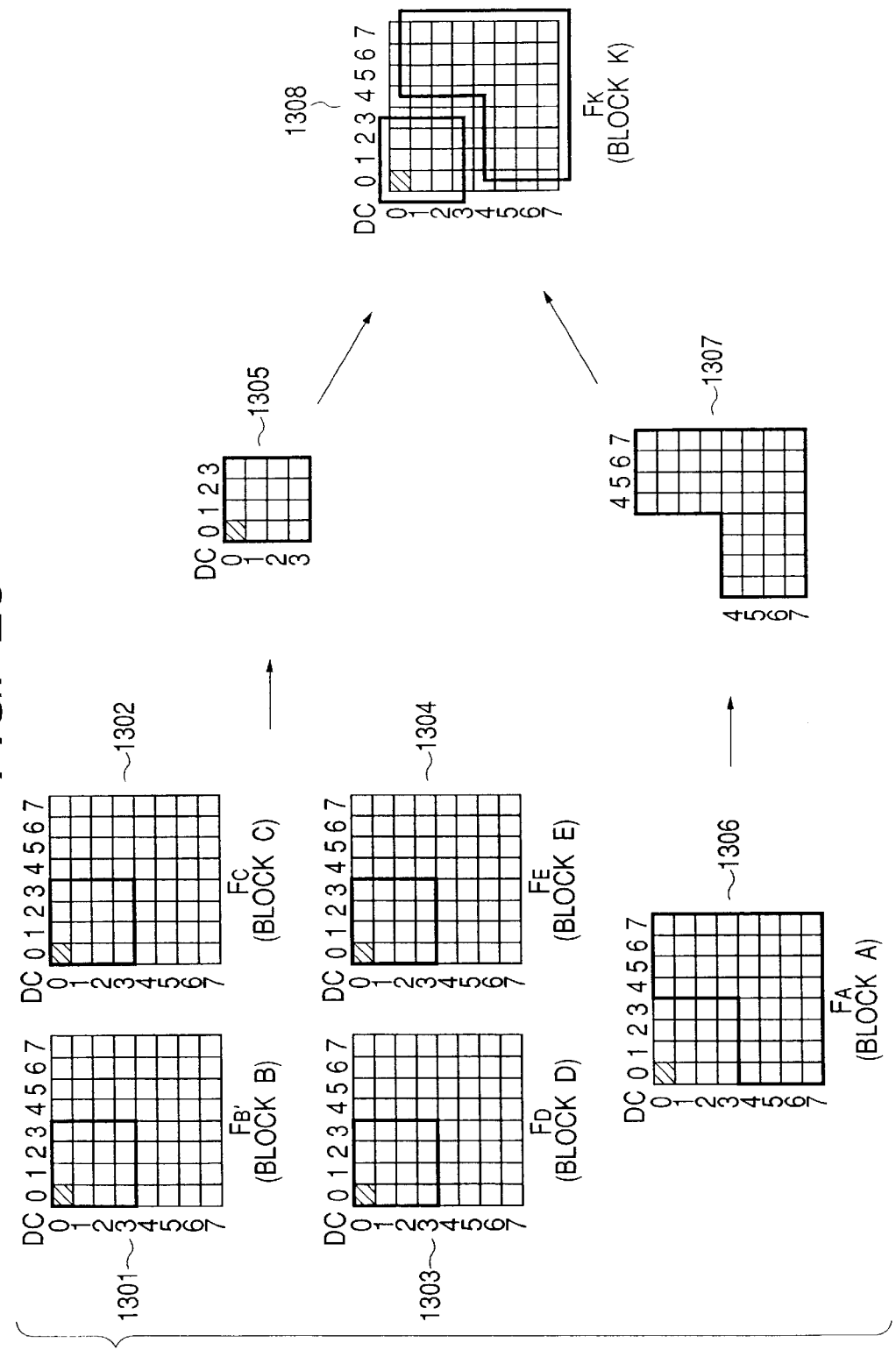
FIG. 28 is an explanatory view showing a series of processings shown in the flowchart of FIG. 27.

A series of processings are schematically shown in FIG. 28.

In FIG. 28, numerals 1301, 1302, 1303, 1304 indicate blocks $F_B'$, $F_C$, $F_D$, $F_E$ after the orthogonal transform of the blocks B', C, D, E. Portions shown by slanting lines are DC components, and rightward and downward portions of the blocks indicate AC components in high frequency areas. Now, the transform coefficient of the DC component and 15 AC low-frequency components is prepared by the interpolation based on the transform coefficients of the same components of the four blocks (shown by bold lines in FIG. 28). The prepared transform coefficient of 16 components is shown by 1305.

On the other hand, for 48 high-frequency components, the high-frequency area (bold line) after the orthogonal transform ($F_A$) of the block A shown by 1306 is used. The transform coefficient of the used high-frequency area is shown by 1307. Subsequently, the low-frequency area 1305 and the high-frequency area 1307 are combined to prepare a new block K ($F_K$) 1308.

The next description will be based on the actual image data shown in FIGS. 29 to 34.

FIG. 29 shows image information 731 of the block A as the noted block of the m-th frame, and transform coefficient information 732 of the orthogonal transform (DCT). Moreover, FIG. 30 shows image information 741 of the block B' of the (m+1)-th frame and transform coefficient information 742 of the orthogonal transform (DCT), FIG. 31 shows image information 751 of the block C and transform coefficient information 752 of the orthogonal transform (DCT), FIG. 32 shows image information 761 of the block D and transform coefficient information 762 of the orthogonal transform (DCT), and FIG. 33 shows image information 771 of the block E and transform coefficient information 772 of the orthogonal transform (DCT).

Figure 35:
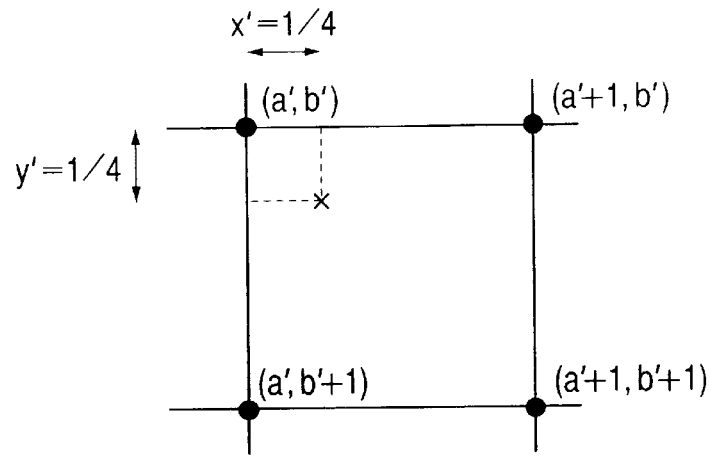
FIG. 35 is an explanatory view showing an interpolation point in the apparatus of FIG. 25.

Now, when it is assumed that the enlargement ratio is four times×four times, the interpolation point is positioned in a cross mark of FIG. 35 by the ratio of the orthogonal transform coefficients of the blocks. Specifically, x'=y'=¼, and 64 pixels in the block are arranged using the position of cross mark as the origin of the block K.

FIG. 34 shows results 781 of transform coefficient preparation of the block K, and inverse orthogonal transform information 782. As apparent from 781, for the DC component and the AC low-frequency components, the low-frequency interpolation results of 742 of FIG. 30, 752 of FIG. 31, 762 of FIG. 32 and 772 of FIG. 33 are substituted. Moreover, for the high-frequency area of 782 of FIG. 34, the transform coefficient value of the high-frequency area of 732 of FIG. 29 is substituted.

Moreover, as apparent from the inverse orthogonal transform information 782 of FIG. 34 and 741 of FIG. 30, even when the information of the m-th frame is synthesized with that of the (m+1)-th frame, they are adapted without any disorder.

The synthesis of a plurality of images by preparing the orthogonal transform coefficients has been described above, and the idea of this embodiment lies in that a completely new block is prepared on the orthogonal transform axis based on a plurality of different still image blocks.

Specifically, the most useful information in synthesizing a plurality of images is high-frequency information. For the DC components and AC low-frequency components, even if a plurality of frames are used, they do not present very necessary information. Because the components are very highly correlated. On the other hand, the high-frequency information differs with each frame for use because of a minute deviation during picking up or inputting. The utilization of the different information is a point of image quality enhancement.

In the present embodiment, since the high-frequency components are synthesized with the low-frequency area of the other still images, the components can efficiently be utilized for the enhancement of image quality without wasting the necessary information.

Moreover, in the above description, the synthesis of two frames of images has been illustrated, but by repeating a series of processings for each of continuous frames, the number of frames to be synthesized is increased, so that a higher resolution still image can be prepared. In this case, if synthesis information is not positioned in the desired interpolation point, the pixel value of the interpolation point is interpolated by interpolating means. The method shown in FIGS. 1 to 3 can be used as the interpolating means.

Figure 36:
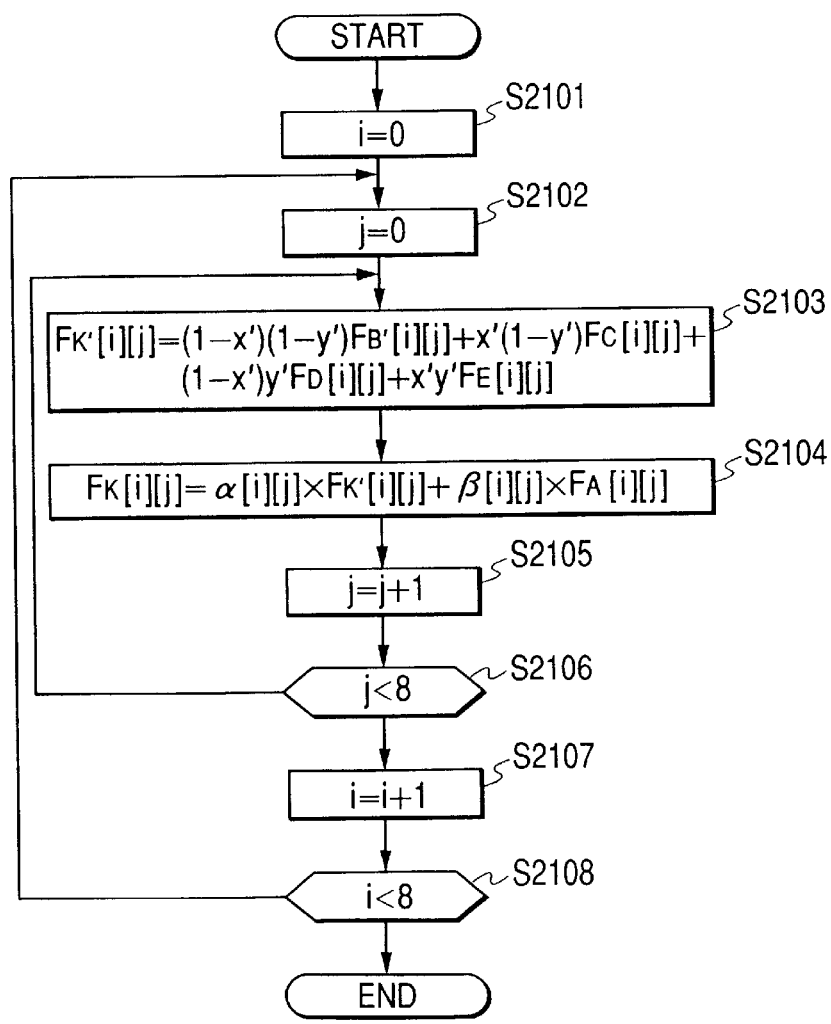
FIG. 36 is a flowchart showing the operation of the main part of the image processing apparatus according to a seventh embodiment of the present invention.

FIG. 36 is a flowchart showing a seventh embodiment of the present invention.

In the seventh embodiment, only the processing in the orthogonal transform coefficient forming unit 1106 of the sixth embodiment is different, and the other units are common.

In FIG. 36, S2101, S2202 show the initialization of variables, and variable i of vertical direction and variable j of horizontal direction are initialized to provide "0".

Subsequently, the following operation is performed in S2103.

$$F_K'[i][j]=(1-x')\cdot(1-y')\cdot F_B'[i][j]+x'\cdot(1-y')\cdot F_C[i][j]+(1-x')\cdot y'\cdot F_D[i][j]+x'\cdot y'\cdot F_E[i][j] \quad (15)$$

Subsequently in S2104, the following operation is performed.

$$F_K[i][j]=\alpha[i][j]\cdot F_K'[i][j]+\beta[i][j]\cdot F_A[i][j] \quad (16)$$

Here, $\alpha[i][j]$, $\beta[i][j]$ are coefficients, which are preset by weighting dependent on i, j as the components after the orthogonal transform.

In the same manner as in the sixth embodiment of FIG. 27, $F_K[i][j]$ indicates the orthogonal transform coefficient of the newly prepared block K. Moreover, x', y' indicates the position of the interpolation point in the same manner as in the sixth embodiment.

Subsequently, the variable j is counted up in S2105, and it is judged in S2106 whether or not the block horizontal components are completed. If YES, the processing returns to S2103. If NO, the variable i is counted up in S2107. It is judged in S2108 whether or not the block vertical components are completed. If YES, the processing returns to S2102. If NO, it is judged that all 64 components are processed, thereby ending the processing.

In the seventh embodiment, different from the sixth embodiment of FIG. 27, the processing is not switched by the value of i, j. Instead, the operation of the sum of products of the information $F_K'[i][j]$ of the (m+1)-th frame and the information $F_A[i][j]$ of the m-th frame is performed with the weighting coefficient dependent on the value of i, j. Specifically, when the values of $\alpha[i][j]$, $\beta[i][j]$ are set as follows, this case can be completely equivalent to the case of FIG. 27.

$$\alpha[i][j]=1, \beta[i][j]=0 \text{ (when } i<4 \text{ and } j<4\text{)}$$

$$\alpha[i][j]=0, \beta[i][j]=1 \text{ (otherwise)} \quad (17)$$

In other words, the embodiment of FIG. 27 includes the embodiment of FIG. 36. In the seventh embodiment of FIG. 36, it is preferable to set the value of $\alpha[i][j]$ to be large in the low-frequency area and to set the value of $\beta[i][j]$ to be large in the high-frequency area.

Moreover, the following is generally established, but this is not limited.

$$\alpha[i][j]+\beta[i][j]=1 \quad (18)$$

Specifically, when the transform coefficient of the high-frequency area is reduced, the following setting is sufficiently possible.

$$\alpha[i][j]+\beta[i][j]<1 \quad (19)$$

It is preferable to experimentally calculate the coefficient setting.

The synthesis of a plurality of images by preparing the orthogonal transform coefficients has been described above. Since the characteristics of the sixth and seventh embodiments line in the processing of data using the orthogonal transform, the constitutions or operations of other portions such as the motion vector operation unit and the synthesizing unit are not limited. The motion vector operation unit has been described based on the vector calculation using the orthogonal transform proposed before by the present applicant, but this is not limited. Conventional methods such as a method of detecting a position in which the square sum of differences of pixels on the real space is minimum may be used.

Moreover, in the data processing, as shown by the following equation, a simple operation may be performed on the orthogonal transform coefficients of the noted block A of the m-th frame and the block B' having a smallest error of the (m+1)-th frame.

$$F_K[i][j]=\alpha[i][j]\cdot F_B[i][j]+\beta[i][j]\cdot F_A[i][j] \quad (20)$$

Specifically, the above-described equations of the data processing can generally result in the following.

$$F_k[i][j] = \sum_{q=1}^{p} \alpha_q[i][j]\cdot F_q[i][j] + \beta[i][j]\cdot F_A[i][j] \quad (21)$$

In the above equation, q denotes block number formed on the (m+1)-th frame, p denotes the number of blocks used in the data processing on the (m+1)-th frame, and $\alpha_q$ denotes a coefficient in the block number q. In the example of FIG. 36, since four blocks of the (m+1)-th frame are used, p=4.

Specifically, in the operation of the sum of products of the transform coefficient $F_A[i][j]$ in the orthogonal transform component i, j of the noted block A of the m-th frame, and the transform coefficient $F_q[i][j]$ in some blocks $F_q$ necessary for the data processing of the (m+1)-th frame, the orthogonal transform coefficient $F_K[i][j]$ of the new block K is calculated.

Moreover, as shown in FIGS. 27, 36, when the value of $F_K[i][j]$ depends on the value of x', y' indicative of the distance of the interpolation point, the value can be represented by the following.

$$F_k[i][j] = \sum_{q=1}^{p} h(x', y') \cdot \alpha_q[i][j] \cdot F_q[i][j] + \beta[i][j] \cdot F_A[i][j] \quad (22)$$

Here, h(x', y') denotes an interpolating operation function dependent on the distance between the interpolation point and an observation point. For the function, linear interpolation, cubic convolution interpolation, and the like can be considered. The orthogonal transform coefficient of the new block can be prepared with high freedom degree from the block information of a plurality of frames using the equations (21) and (22).

Moreover, in the sixth and seventh embodiments, the description has been based on DCT of the block of 8×8 pixels in the orthogonal transform, but it goes without saying that the number of pixels is not limited to this.

Furthermore, in the sixth and seventh embodiments, the continuous images of the m-th frame and the (m+1)-th frame have been described, but continuous or discontinuous images are not limited. The motion vector and the orthogonal transform coefficient between the m-th frame and the (m+n)-th frame (n≧1) can naturally be synthesized using the above technique.

As described above, according to the present invention, when the orthogonal transform coefficient of the new block is prepared based on the orthogonal transform information of a plurality of frames, and the inverse orthogonal transform information is positioned deviating from the sample point of original information, a plurality of images can be synthesized without any disorder.

Figure 37:
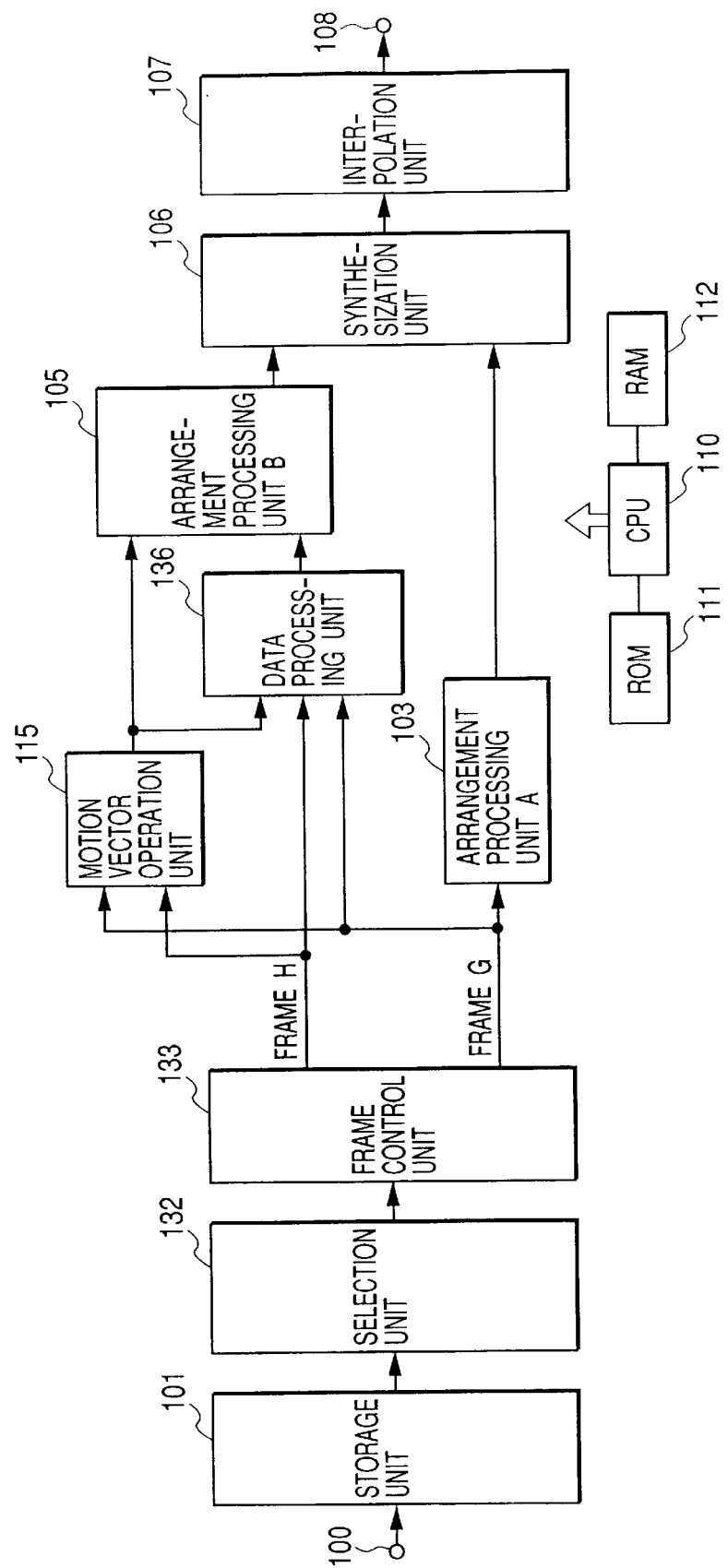
FIG. 37 is a block diagram showing the image processing apparatus according to an eighth embodiment of the present invention.

An eighth embodiment of the present invention will next be described. FIG. 37 is a block diagram showing the constitution of the image processing apparatus according to the eighth embodiment of the present invention, the constituting elements similar to those of FIGS. 14 and 25 are denoted by the same reference numerals, and the description thereof is omitted.

In FIG. 37, a selection unit 132 judges a time image to be set as a reference frame from image information of (n+1) frames stored in the storage unit 101. It is now assumed that the reference frame set according to judgment result is tentatively set to frame G. A frame control unit 133 is means for selecting two types of images as processing objects. For the two types of images, one is the frame G as the reference frame, and the other is one frame among stored n frames other than the frame G (frame H is set).

The motion vector operation unit 115 measures movement amount of partial movement as the motion vector based on the difference of two types of images of the frames G and H. The constitution of the motion vector operation unit 115 itself is the same as that of the fourth to seventh embodiments.

A data processing unit 136 uses the images of frames H and G to calculate the image fit for the image information of the frame G, and supplies the image to the subsequent-stage arrangement processing unit B. The operation of the synthesizing unit 106 and the subsequent operation are similar to those of the fourth to seventh embodiments.

Figure 38:
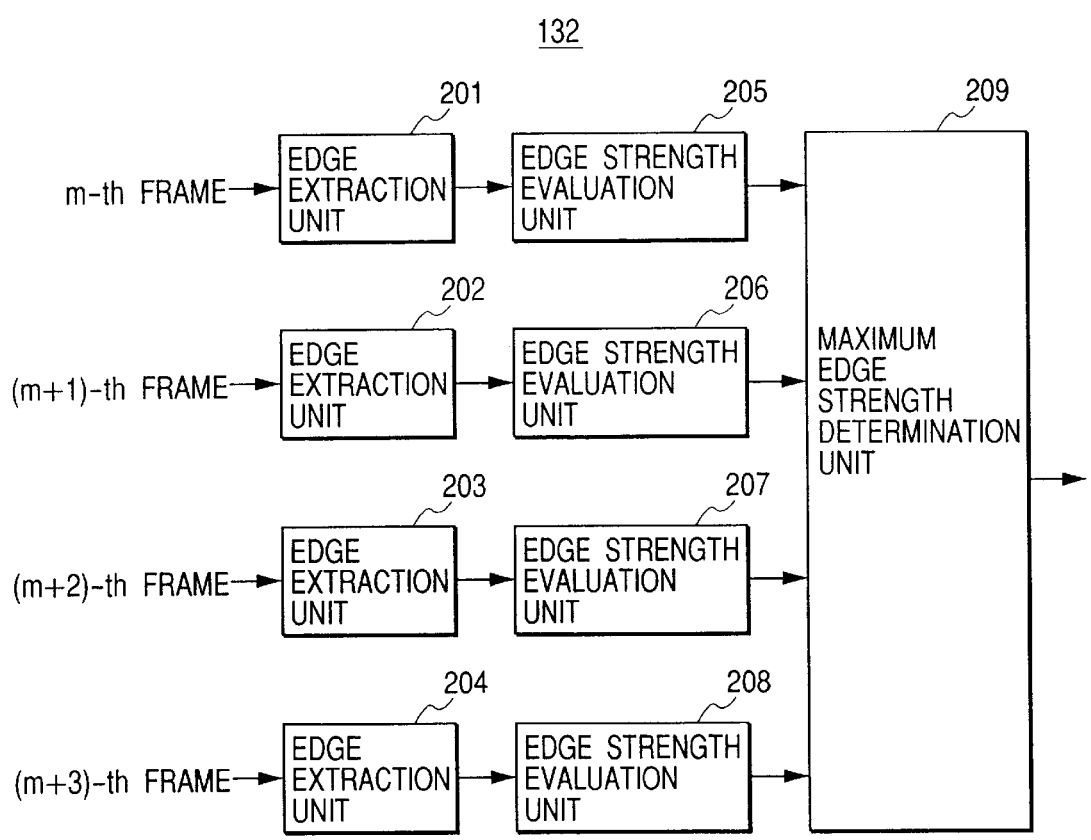
FIG. 38 is a block diagram showing the concrete constitution of a selection unit in the apparatus of FIG. 37.

FIG. 38 is a block diagram showing one example of the concrete constitution of the selection unit 132 as one characteristic of the eighth embodiment. Here, as the example, it is assumed that four frames in total of continuous images from the m-th frame to (m+3)-th frame are stored in the storage unit 101. Numerals 201, 202, 203, 204 denote edge extraction units, which are means for extracting edge information included in the image based on the image information of the stored four frames.

Figure 39:
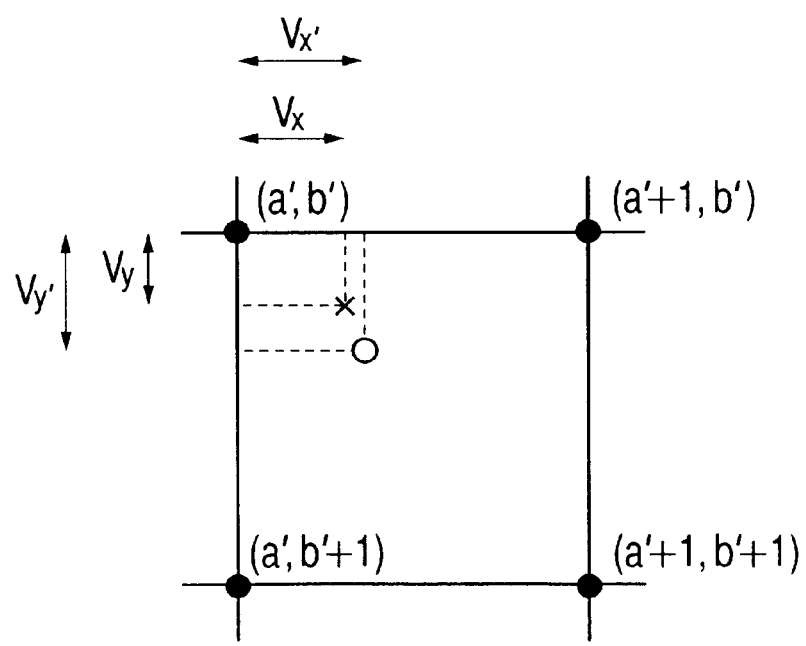
FIG. 39 is a diagram showing the filtering coefficient of Laplacian edge extraction filter for use in the selection unit of FIG. 38.

FIG. 39 shows the example of a general Laplacian edge extraction filter.

Now, assuming that the pixel value in coordinate (x, y) on the image of (m+s)-th frame (0≦s≦3) is set to $f_s(x, y)$, and the value after the edge extraction processing is set to $k_s(x, y)$, the following operation of the sum of products is performed in the edge extraction filter of FIG. 39.

$k_s(x, y) = f_s(x-1, y-1) + f_s$ $(x, y-1) + f_s(x+1, y-1) + f_s$ $(x-1, y) - 8f_s(x, y) + f_s$ $(x+1, y) + f_s(x-1, y+1) + f_s$ $(x, y+1) + f_s(x+1, y+1)$ \quad (23)

In FIG. 38, edge strength evaluation units 205, 206, 207, 208 are means for integrating edge strengths extracted by the edge extraction units 201 to 204 over the entire image. When the number of vertical pixels of the entire image is set to V, and the number of horizontal pixels is set to H, the edge strength Ps of the (m+s)-th frame is calculated as follows:

$$P_s = \sum_{x=0}^{H} \sum_{y=0}^{V} k'_s(x, y) \quad (24)$$

in which $k'_s(x, y) = |k_s(x, y)|$, when $|k_s(x, y)| \geq th$ (th denotes a preset threshold value), and $k'_s(x, y) = 0$ in the cases other than the above.

A maximum edge strength determination unit 209 determines a frame s in which Ps obtained by each of the edge strength evaluation units 205 to 208 is maximum as the reference frame. Specifically, the edge strength which is a unique evaluation function is set, and the frame in which the edge strength is evaluated as being largest over the entire image is selected among the stored plurality of frames of images.

To set the image with the largest edge strength as the reference frame is advantageous not only when the motion vector is calculated as described later, but also when the data processing of the other object frames is performed. In the evaluation by the edge strength, an image whose focus is most clearly picked-up can be assumed among the stored plurality of frames. Therefore, the images of the object frames other than the reference frame serve to attach an additional value to the image quality of the reference frame, and the enhancement of the image quality equal to or greater than that of the reference frame singly can be ensured even at minimum.

Moreover, for the constitution of FIG. 38, to facilitate the description, the example in which all frames are processed in a row has been described, but the constitution may naturally comprise a single edge extraction unit and edge strength evaluation unit for a vertical processing.

Moreover, in the equation (24) the absolute value of $k_s(x, y)$ is used for the calculation of $k_s'(x, y)$, but the square of $k_s(x, y)$ may naturally be used to perform the operation.

The data processing unit 136 will next be described with reference to FIG. 40.

Figure 40:
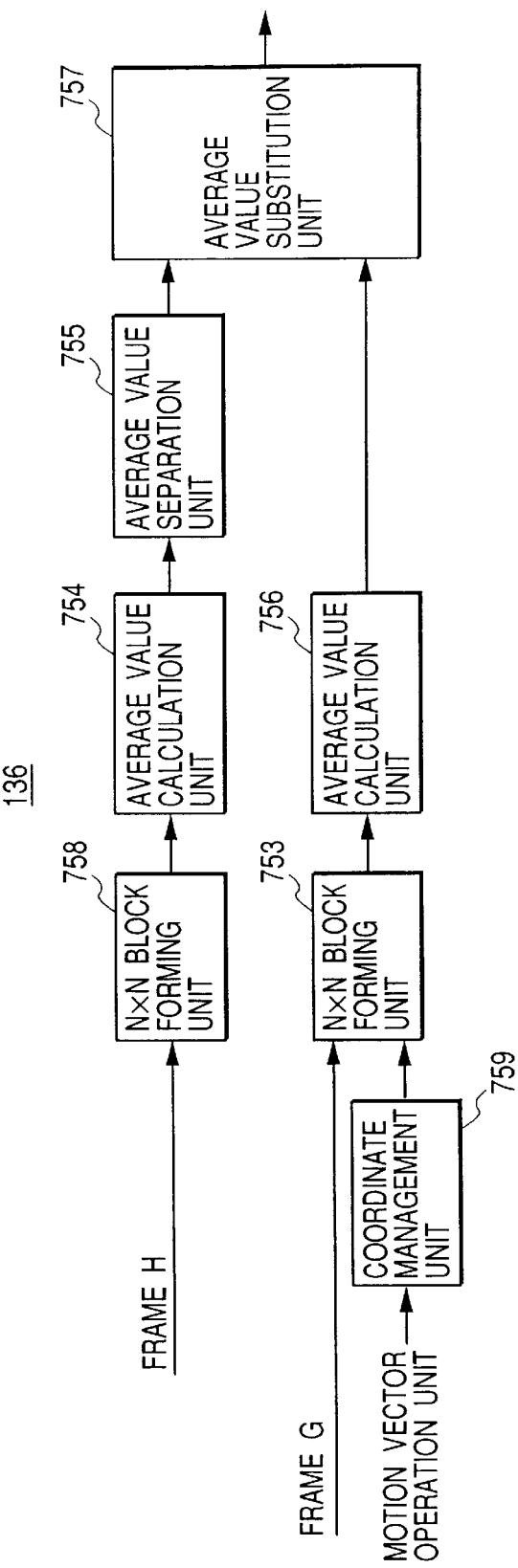
FIG. 40 is a block diagram showing the concrete constitution of the data processing unit in the apparatus of FIG. 37.

In FIG. 40, a coordinate management unit 759 manages the position of the frame G as the reference frame to which the block of the frame H as the object frame is to correspond in accordance with the vector calculated from the motion vector operation unit 115. The coordinate management unit 759 outputs an address in which the evaluation function of the equation (7) is minimum.

An N×N' block forming unit 758 forms the image of the frame H into a block in the unit of N×N pixels. This means does not need to be performed in the data processing unit 136, if the pixel value information of the block (referred to as the noted block) used in the previous-stage motion vector operation unit 115 is retained.

Similarly, an N×N block forming unit 753 forms the block of the N×N pixel unit of the frame G based on the address received from the coordinate management unit 759. This means does not need to be performed in the data processing unit 136, if the pixel value information of the block (referred to as the error minimum block) whose evaluation function is minimum and the block positioned in the periphery of the error minimum block (referred to as the peripheral block) are retained among the blocks prepared and evaluated inside the previous-stage motion vector operation unit 115.

Now, the noted block on the frame H is set to the block A, and the error minimum block with respect to the block A on the frame G is set to the block B'. Moreover, among two types of blocks formed by horizontal shifting each by one pixel to the left and the right using the block B' as the reference, the block whose evaluation function is evaluated as being small is set to the block C. Similarly, among two types of blocks formed by shifting each by one pixel upward and downward in the vertical direction using the block B' as the reference, the block whose evaluation function is evaluated as being small is set to the block D.

Moreover, the block which has x coordinate of origin of the block C and y coordinate of origin of the block D is set to the block E. The block E deviates from the block B' by one pixel in each of the horizontal and vertical directions.

An average value calculation unit 754 is means for calculating the average value of pixel values within the block A as the noted block. When the origin coordinate of the block A is set to (a0, b0), the average value $T_A$ of the block A is calculated as follows.

$$T_A = 1/N^2 \times \sum_{x=a0}^{a0+N-1} \sum_{y=b0}^{b0+N-1} f_H(x, y) \quad (25)$$

(in which $f_H(x, y)$ denotes the pixel value of coordinate (x, y) of the frame H)

An average value separation unit 755 is means for separating the calculated average value $T_A$ from each pixel in the block A by subtraction. When the value after the subtraction is set to $g_H(x, y)$, calculation is performed in the following equation (26).

$$g_H(x, y) = f_H(x, y) - T_A \quad (26)$$

On the other hand, an average value calculation unit 756 calculates the average value of each of the blocks B', C, D, E of the frame G. When the origin coordinate of the block B' is set to (a', b'), the average values $T_{B'}$, $T_C$, $T_D$, $T_E$ of the blocks are calculated as follows:

$$T_{B'} = 1/N^2 \times \sum_{x=a'}^{a'+N-1} \sum_{y=b'}^{b'+N-1} f_G(x, y) \quad (27)$$

$$T_C = 1/N^2 \times \sum_{x=a'+c}^{a'+c+N-1} \sum_{y=b'}^{b'+N-1} f_G(x, y) \quad (28)$$

$$T_D = 1/N^2 \times \sum_{x=a'}^{a'+N-1} \sum_{y=b'+d}^{b'+d+N-1} f_G(x, y) \quad (29)$$

$$T_E = 1/N^2 \times \sum_{x=a'+c}^{a'+c+N-1} \sum_{y=b'+d}^{b'+d+N-1} f_G(x, y) \quad (30)$$

(in which $f_G(x, y)$ denotes the pixel value of coordinate (x, y) of the frame G).

For c, d, as described with reference to the flowchart of FIG. 17, in the block formed by shifting by one pixel to the left and the right in the horizontal direction, when the block shifted to the right is evaluated such that the evaluation function result indicative of the similarity to the block A is small, c=1. Conversely, when the evaluation function result of the block shifted to the left is evaluated as being small, c=−1. Similarly, for the comparison of the vertical direction, d=1 in the downward direction, and d=−1 in the upward direction.

Moreover, since the four blocks, that is, the blocks B', C, D, E largely overlap one another, the average value of only one block of the four blocks is calculated, and the average values of the remaining three blocks may be calculated by adding/subtracting only non-overlapping pixels of the block to/from the calculated average value of the block.

Subsequently, in an average value substitution unit 757, the following operation is performed.

$$h_H(x, y) = g_H(x, y) + (1-Vx')\cdot(1-Vy')\cdot T_B + Vx'\cdot(1-Vy')\cdot T_C + (1-Vx')\cdot Vy'\cdot T_D + Vx'\cdot Vy'\cdot T_E \quad (31)$$

Here, Vx', Vy' indicate the distance to the interpolation point from the origin (a', b') of the block B'. Specifically, there are remarkably few cases in which the coordinate of Vx, Vy (=x, y) calculated by the equations (8), (9) completely agrees on the desired interpolation point. Actually, interpolation is performed on the closest interpolation point Vx', Vy' based on the calculated value of Vx, Vy.

FIG. 41 shows the example of positional relation of Vx, Vy, Vx', Vy'. Black circle marks indicate the sample points of the frame G, a cross mark indicates a point distant from the origin coordinate (a', b') by Vx, Vy calculated by the equations (8), (9) and a circle mark indicates the interpolation point to be really interpolated so as to increase the resolution. Now, when c=1, and d=1, the coordinate of the interpolation point is (a'+Vx', b'+Vy'). The interpolation point is the origin of the block A, and is an arrangement point.

The equation (31) means that the average value of the block A is substituted for the average values of the blocks B', C, D, E. Additionally, the average value to be substituted is dependent on the interpolation point of the block A, and the linear operation of the average values of four blocks is performed. In other words, the DC component of the block A is changed so as to be fit for the blocks B', C, D, E on the reference frame, so that only the AC component of the block A is utilized.

The data processing unit 136 has been described above, but the eighth embodiment is not limited to the above-described example. Since the blocks B', C, D, E largely overlap one another, there may be no large difference among the calculated average values. In this case, a simple method may be used which comprises adding only the average value T,'of the block B'to gH(x, y).

Figure 42:
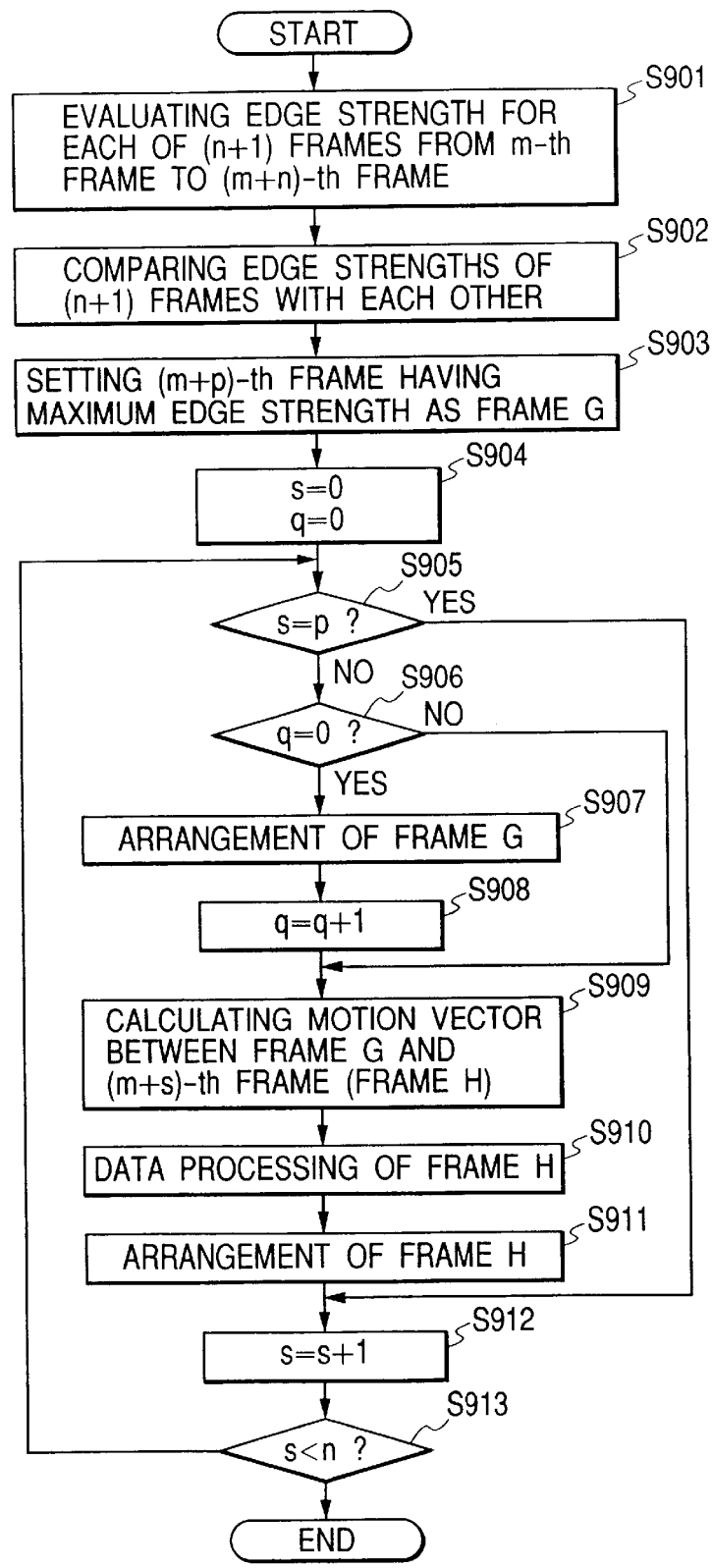
FIG. 42 is a flowchart showing a series of processings performed in the apparatus of FIG. 37.

FIG. 42 shows the flowchart of the operation procedure of repeated processing including the processing for calculating and arranging the motion vector centering on the frame control unit 133 particularly when three or more frames are used.

First in S901, the edge strength is evaluated for each of (n+1) frames from the m-th frame to the (m+n)-th frame. Subsequently, in S902, the frames are compared with each other.

Subsequently, in S903, the (m+p)-th frame having the maximum edge strength is set as the frame G, which is the reference frame. Next in S904, variables s and q are initialized to provide 0. It is then judged in S905 whether or not the variable s is equal to p. This determines whether or not the frame to be presently processed is the reference frame.

If the frame s to be now processed is not the reference frame, it is judged in S906 whether or not q equals zero. This determines whether or not the repeating frequency of the present processing is first time. If q equals zero, the frame G is arranged in S907, and the variable q is counted up in S908. In the negative determination of S906, it is determined that the processing is repeated twice or more, and the frame G as the reference frame is already arranged, so that S907, S908 are jumped.

Subsequently, in S909, the motion vector is calculated between the frame G and the (m+s)-th frame (frame H). Next, after the data processing of the frame H in S910, the arrangement of the frame H is performed in S911. After counting up the variable s in S912, it is judged in S913 whether or not the repeating frequency reaches n-times. If not, it is judged that non-processed frame is stored, the processing returns to S905, and the similar processing is repeated on the other frames.

When the arrangement of all the stored frames is completed, one frame of image information is synthesized, thereby ending the processing.

A series of processings of the eighth embodiment have been described, and the most characteristic part of the eighth embodiment lies in the selection unit 132. Therefore, the contents of the motion vector operation unit 115, the data processing unit 136, the arrangement processing unit 105, and the like are not limited. The motion vector operation can be realized even in the method not using the orthogonal transform, and the constitution may comprise only arranging the pixel value of each object frame without processing any data of the object frame.

Moreover, the evaluation function of the edge strength of the equation (24) is not limited. The following equation (32) can also be considered as the modification of the equation (7):

$$P_s = \sum_{x=0}^{H} \sum_{y=0}^{v} k'_s(x, y) \quad (32)$$

in which $k'_s(x, y)=1$, when $|k_s(x, y)| \geq th$ (th denotes a preset threshold value), and $k'_s(x, y)=0$ in the cases other than the above.

This means that the number of pixels is counted when the value after the edge extraction filter reaches a certain threshold value or more. Even in the equation (32) the edge strength of the entire image can sufficiently be grasped.

Moreover, the coefficient of the edge extraction filter is not limited to the coefficient shown in FIG. 39, and the filter having a stronger noise resistance may be used.

Furthermore, for the evaluation of the edge strength, systems in which no edge extraction filter is used such as a system of performing determination based on the transform coefficient of the high-frequency component of the orthogonal transform may also be considered. In this case, the frame in which the high-frequency power is large is evaluated, and the frame whose power is evaluated as being large is set as the reference frame.

Additionally, in the eighth embodiment, the edge information is used in the image characteristic amount, but this is not limited, and the other image characteristic amount may be used to perform the evaluation.

Figure 43:
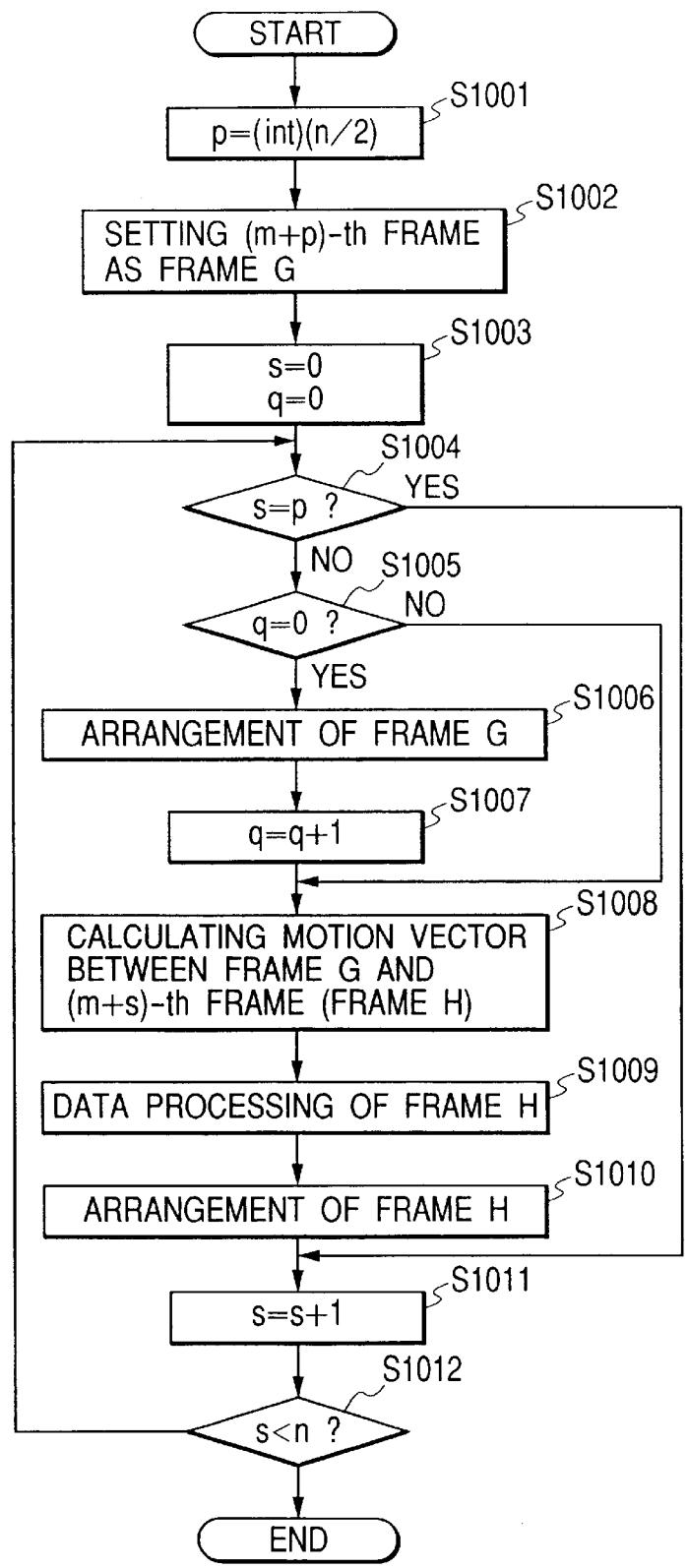
FIG. 43 is a flowchart showing the operation of the main part of the image processing apparatus according to a ninth embodiment of the present invention.

FIG. 43 is a flowchart showing the operation procedure according to a ninth embodiment of the present invention. In the ninth embodiment, only the selecting method by the selection unit 132 of FIG. 37 is different, and the other units are the same.

Moreover, in the flowchart of FIG. 43 there is shown an example in which one frame of high-resolution still image is prepared based on the image information of (n+1) frames from the m-th frame to the (m+n)-th frame.

In a division process of S1001, the integer portion of the division of value n by 2 is substituted as p. The actual processing can be realized by bit shifting. Subsequently, in S1002, the (m+p)-th frame is set as the frame G which is the reference frame. Next in S1003, variables s and q are initialized to provide 0. It is then judged in S1004 whether or not the variable s is equal to p. This determines whether or not the frame to be presently processed is the reference frame.

If the frame S to be now processed is not the reference frame, it is judged in S1005 whether or not q is zero. This determines whether or not the frequency of the present processing is first time. If q is zero, the frame G is arranged in S1006, and the variable q is counted up in S1007. In the negative determination of S1005, it is determined that the processing is repeated twice or more, and the frame G as the reference frame is already arranged, so that S1006, S1007 are jumped.

Subsequently, in S1008, the motion vector is calculated between the frame G and the (m+s)-th frame (frame H). After the data processing of the frame H in S1009, the arrangement of the frame H is performed in S1010. After counting up the variable s in S1011, it is judged whether or not the repeating frequency reaches n-times. When non-processed frame is stored, the processing returns to S1004, and the similar processing is repeated on the other frames.

When the arrangement of all the stored frames is completed, a single image is synthesized, thereby ending the processing.

As described above, the ninth embodiment is characterized in that the selection of the reference frame is determined according to the inputted frame order.

Figure 44:
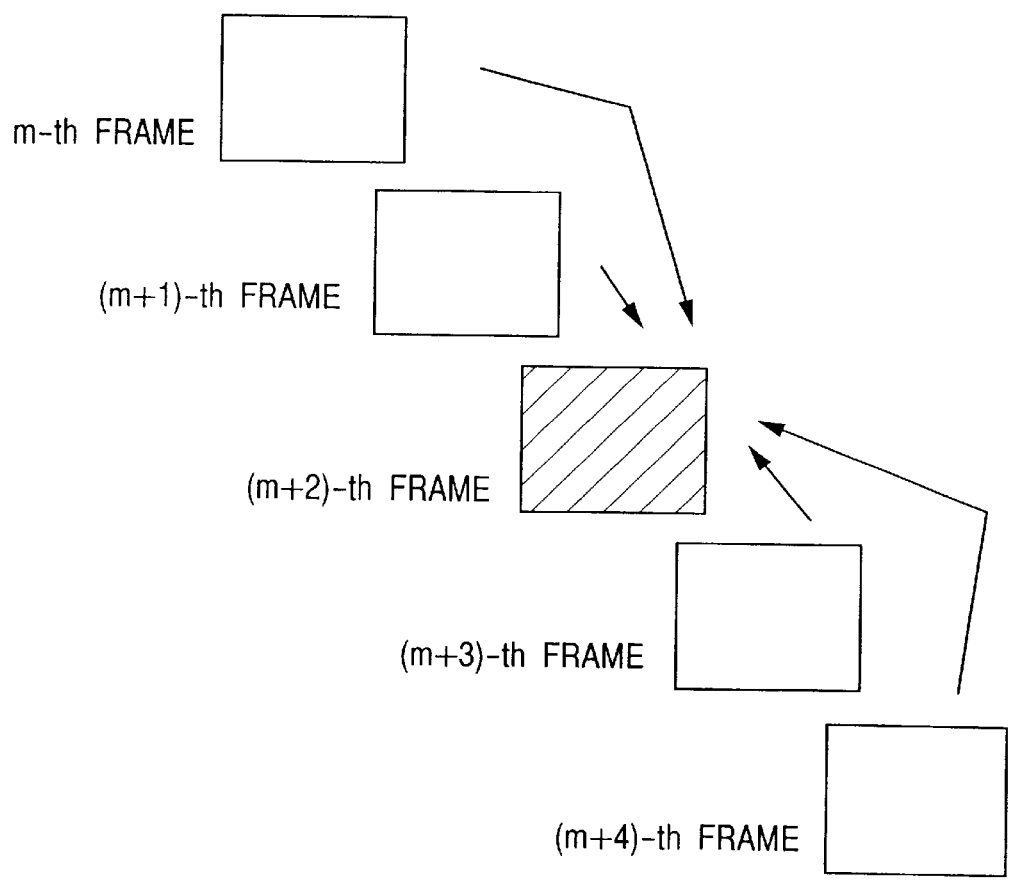
FIG. 44 is an explanatory view showing the determination of a reference frame according to the flowchart of FIG. 43.

FIG. 44 shows the determination of the reference frame when five frames are stored. The frame shown by slanting lines is the reference frame.

When five frames of images are stored, n=4, then the division by 2 results in p=2, so that the (m+2)-th intermediate frame is set as the reference frame.

The reference frame is compared with the other four frames to perform the processing.

If the number of stored frames is an even number, the division of n by 2 results in a non-integer. Therefore, the frame cannot exactly be intermediate, but the frame before and after the middle may be set as the reference frame (in the flowchart of FIG. 43, the frame is before the middle). Specifically, in the method according to the embodiment of the flowchart of FIG. 42, the selection of the reference frame is set based on "the image characteristic". The edge strength is evaluated as the evaluation function which can represent the characteristic amount of the image most remarkably. It is certain that when selection is performed by the image characteristic, the image having an optimum image quality can be set as the reference frame.

However, since the continuous images are handled, the image cannot necessarily be said to be optimum in point of time. Therefore, in the embodiment of the flowchart of FIG. 43, selection is performed by making much of "the time correlation of the images". When the intermediate image in the time axis is used, and compared with the frames of the stored images, and the image continuity is considered, the central image having the highest image correlation can be estimated. Specifically, since the time deviation is minimum, the difference between each frame and the reference image can be minimized.

The embodiments of the present invention have been described above, but a compromise between the flowcharts of FIGS. 42 and 43 can also be considered.

Specifically, the characteristic amount of the image and the position on the time axis are considered to prepare a new evaluation function, so that the reference frame can be determined. In this case, even when the frame optimum on the time axis has an unclear image quality, the generally optimum image can be selected.

As described above, according to the eighth and ninth embodiments, by setting the single reference frame as the reference of comparison with the frames from a plurality of stored frames based on the characteristic amount and time correlation of the image, no errors are accumulated during the vector calculation. Even when an unclear frame exists, excellent synthesis can be realized without any problem.

A storage medium will next be described as another embodiment of the present invention.

Each of the first to ninth embodiments of the present invention can also be achieved by hardware constitution, or by a computer system constituted of CPU and memory.

In the constitution of the computer system, the memory constitutes the storage medium according to the present invention. Specifically, the objects of the present invention can be achieved by using in the system or the apparatus the storage medium in which the program code of software for executing the operations described in the embodiments is stored, and by reading and executing the program code stored in the storage medium by the system or the CPU 110 of the apparatus.

Moreover, as the storage medium, ROM, RAM and other semiconductor memories, an optical disk, an optomagnetic disk, a magnetic medium, and the like may be used, or these media may be constituted as CD-ROM, a floppy disk, a magnetic medium, a magnetic card, a nonvolatile memory card, and the like for use.

Therefore, also by using the storage medium in the systems and apparatuses other than the system and apparatus described as each embodiment, and by reading and executing the program code stored in the storage medium by the system or the computer, the functions equivalent to those of the above-described embodiments can be realized. Additionally, the equivalent effects can be obtained, and the objects of the present invention can be achieved.

Furthermore, in a case in which OS or the like operating on the computer performs a part or the whole of the processing, or in a case where the program code read from the storage medium is written into a memory disposed in an expansion function board inserted in the computer or an expansion function unit connected to the computer, and then CPU or the like disposed in the expansion function board or the expansion function unit performs a part or the whole of the processing based on the instruction of the program code, the function equivalent to that of each embodiment can be realized, the equivalent effect can be obtained, and the objects of the present invention can be achieved.

Additionally, in each of the above embodiments, the example in which the image picked-up by the video camera is once recorded in the recording medium such as the video tape and the recording medium is reproduced to store a plurality of desired frames has been described. However, a plurality of frames as the processing objects in the present invention are not limited to the images reproduced from the intermediate medium, and the constitution may comprise directly storing a plurality of frames from the picked-up image according to user's designation to prepare a high-resolution still image.

Moreover, each of the above-described embodiments may be applied to a system comprising a plurality of apparatuses (e.g., a host computer, an interface apparatus, a reader, a printer, and the like), or to a device comprising one apparatus (e.g., a copying machine, a facsimile device, and the like).

As described above with reference to various embodiments, according to the present invention, the image information with a remarkably higher image quality can be prepared as compared with the interpolating technique for preparing the high-resolution still image from one frame of low-resolution still image.

Furthermore, according to the present invention, since one frame of high-resolution still image information can easily be prepared from the low-resolution still image information picked-up by the video camera, there can be provided the communication between apparatuses different in input/output resolution, the video camera or the printer which outputs a high-quality image by enlargement magnification change, and the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method, comprising the steps of:
   (a) inputting a plurality of mutually different images having predetermined resolutions;
   (b) forming a new image having a high resolution as compared with the predetermined resolutions by shifting and synthesizing an interpolation image, obtained from other images, with respect to a reference image as one of the plurality of images with a resolution less than a pixel pitch in the predetermined resolutions; and
   (c) detecting relative positions among the plurality of images, wherein a shift amount of the remaining images with respect to the reference image is determined in accordance with the relative position.

2. A method according to claim 1, wherein the relative position is detected as a motion vector in said detecting step.

3. A method according to claim 2, wherein said detecting step comprises the steps of:
   detecting a first motion vector between two frames of images apart from each other by at least two frames or more with the resolution corresponding to the pixel pitch in said predetermined resolutions; and
   dividing the first motion vector by the number of said frames apart from each other to obtain a second motion vector having the resolution less than the pixel pitch in said predetermined resolutions, and outputting the second motion vector.

4. A method according to claim 3, wherein in said detecting step, the number of frames between the two frames which are objects for detecting said first motion vector can be switched in accordance with a size of said detected first motion vector.

5. A method according to claim 2, wherein said detecting step comprises the step of detecting said motion vector using an orthogonal transform coefficient obtained by orthogonally transforming said two frames of images.

6. A method according to claim 5, wherein said detecting step further comprises the steps of:
performing template matching between said two frames of images to roughly detect said motion vector; and
finely detecting said motion vector using the rough detection result and the orthogonal transform coefficient of said two frames.

7. A method according to claim 1, wherein said reference image is selected from the plurality of images in accordance with edge strengths of the images in the plurality of images.

8. An image processing method, comprising the steps of:
(a) inputting a plurality of mutually different images having predetermined resolutions;
(b) detecting relative positions among the plurality of images with a resolution less than a pixel pitch in the predetermined resolutions; and
(c) forming a new image having a high resolution as compared with the predetermined resolutions using said plurality of images in accordance with information indicating the relative positions obtained in the detecting step,
wherein said forming step comprises the steps of:
synthesizing an interpolation image, formed using other images, with respect to a reference image as one of the plurality of images to prepare the new image; and
the interpolation image is obtained by synthesizing an orthogonal transform coefficient obtained from the reference image and orthogonal transform coefficients obtained from said other images in accordance with the relative positions.

9. A method according to claim 8, wherein said reference image is selected from said plurality of images in accordance with image edge strengths in said plurality of images.

10. A method according to claim 8, wherein said reference image is selected from said plurality of images in accordance with an input order of said plurality of images.

11. An image processing method, comprising the steps of:
(a) inputting a plurality of mutually different images having predetermined resolutions;
(b) forming an interpolation image from the plurality of images;
(c) forming a new image having a high resolution as compared with said predetermined resolutions by shifting and synthesizing the interpolation image with respect to a reference image as one of said plurality of images with a resolution less than a pixel pitch in said predetermined resolutions; and
(d) detecting relative positions among the plurality of images, wherein a shift amount of said interpolation image with respect to said reference image is determined in accordance with the relative positions.

12. A method according to claim 11, wherein said step of forming the interpolation image comprises synthesizing orthogonal transform coefficients obtained from said plurality of images to obtain said interpolation image.

13. A method according to claim 12, wherein the synthesizing of said orthogonal transform coefficients is performed with a ratio for a frequency area of each orthogonal transform coefficient.

14. A method according to claim 13, wherein the synthesizing of said orthogonal transform coefficients is performed by selecting the orthogonal transform coefficients obtained from said plurality of images in accordance with the frequency area of each orthogonal transform coefficient.

15. An image processing apparatus, comprising:
(a) input means for inputting a plurality of mutually different images having predetermined resolutions;
(b) forming means for forming a new image having a high resolution as compared with the predetermined resolutions by shifting and synthesizing an interpolation image, obtained from other images, with respect to a reference image as one of the plurality of images with a resolution less than a pixel pitch in the predetermined resolutions; and
(c) detecting means for detecting relative positions among the plurality of images, wherein a shift amount of the remaining images with respect to the reference image is determined in accordance with the relative position.

16. An apparatus according to claim 15, wherein said detecting means detects said motion vector using orthogonal transform coefficients obtained by orthogonally transforming two frames of images.

17. An image processing apparatus, comprising:
(a) input means for inputting a plurality of mutually different images having predetermined resolutions;
(b) detecting means for detecting relative positions among the plurality of images with a resolution less than a pixel pitch in the predetermined resolutions; and
(c) forming means for forming a new image having a high resolution as compared with the predetermined resolutions using said plurality of images in accordance with information indicating the relative positions obtained by the detecting means,
wherein said forming means synthesizes an interpolation image formed using other images with respect to a reference image as one of the plurality of images to prepare the new image, and the interpolation image is obtained by synthesizing an orthogonal transform coefficient obtained from the reference image and orthogonal transform coefficients obtained from said other images in accordance with the relative positions.

18. An image processing apparatus, comprising:
(a) inputting means for inputting a plurality of mutually different images having predetermined resolutions;
(b) first forming means for forming an interpolation image from the plurality of images;
(c) second forming means for forming a new image having a high resolution as compared with said predetermined resolutions, by shifting and synthesizing the interpolation image with respect to a reference image as one of said plurality of images with a resolution less than a pixel pitch in said predetermined resolutions; and
(d) detecting means for detecting relative positions among the plurality of images, wherein said second forming means determines a shift amount of said interpolation image with respect to said reference image in accordance with the relative positions.

19. An apparatus according to claim 18, wherein said first forming means synthesizes orthogonal transform coefficients obtained from said plurality of images to obtain said interpolation image.

20. A recording medium readable by a computer which stores a program for performing an image processing process comprising the steps of:
(a) inputting a plurality of mutually different images having predetermined resolutions;
(b) forming a new image having a high resolution as compared with the predetermined resolutions by shifting and synthesizing an interpolation image, obtained from other images, with respect to a reference image as one of the plurality of images with a resolution less than a pixel pitch in the predetermined resolutions; and
(c) detecting relative positions among the plurality of images, wherein a shift amount of the remaining images with respect to the reference image is determined in accordance with the relative position.

21. A recording medium readable by a computer which stores a program for performing an image processing process comprising the steps of:
(a) inputting a plurality of mutually different images having predetermined resolutions;
(b) forming an interpolation image from the plurality of images;
(c) forming a new image having a high resolution as compared with said predetermined resolutions by shifting and synthesizing the interpolation image with respect to a reference image as one of said plurality of images with a resolution less than a pixel pitch in said predetermined resolutions; and
(d) detecting relative positions among the plurality of images, wherein a shift amount of said interpolation image with respect to said reference image is determined in accordance with the relative positions.

22. A program product for performing an image processing process comprising the steps of:
(a) inputting a plurality of mutually different images having predetermined resolutions;
(b) forming a new image having a high resolution as compared with the predetermined resolutions by shifting and synthesizing an interpolation image, obtained from other images, with respect to a reference image as one of the plurality of images with a resolution less than a pixel pitch in the predetermined resolutions; and
(c) detecting relative positions among the plurality of images, wherein a shift amount of the remaining images with respect to the reference image is determined in accordance with the relative position.

23. A program product for performing an image processing process comprising the steps of:
(a) inputting a plurality of mutually different images having predetermined resolutions;
(b) forming an interpolation image from the plurality of images;
(c) forming a new image having a high resolution as compared with said predetermined resolutions, by shifting and synthesizing the interpolation image with respect to a reference image as one of said plurality of images with a resolution less than a pixel pitch in said predetermined resolutions; and
(d) detecting relative positions among the plurality of images, wherein a shift amount of said interpolation image with respect to said reference image is determined in accordance with the relative positions.

24. A method according to claim 1, wherein said reference image is selected from said plurality of images in accordance with an input order of said plurality of images.

* * * * *

UNITED STATES PATENT AND TRADEMARK OFFICE
CERTIFICATE OF CORRECTION

PATENT NO. : 6,804,419 B1
DATED : October 12, 2004
INVENTOR(S) : Nobutaka Miyake It is certified that error appears in the above-identified patent and that said Letters Patent is hereby corrected as shown below:

Column 12,
Line 40, Formula (6), the portion of the formula reading "$vx/2N$" should read -- $vx/2N)$ --.

Column 26,
Line 33, "Vy ' indicate" should read -- Vy' indicate --; and
Line 65, "T,' of the block B'to" should read -- $T_B$' of the block B' to --.

Column 29,
Line 1, "most:" should read -- most --; and
Line 18, delete the paragraph break after "considered.".

Signed and Sealed this

Fourteenth Day of February, 2006

JON W. DUDAS
*Director of the United States Patent and Trademark Office*